United States Patent
Cohen et al.

(10) Patent No.: US 12,388,823 B1
(45) Date of Patent: Aug. 12, 2025

(54) SECURITY ENGINE FOR IOT DEVICES

(71) Applicant: Zuul, Inc., Columbia, MD (US)

(72) Inventors: Andrew Cohen, Grasonville, MD (US); Edward Stanford, Highland, MD (US)

(73) Assignee: Zuul, Inc., Columbia, MD (US)

( * ) Notice: Subject to any disclaimer, the term of this patent is extended or adjusted under 35 U.S.C. 154(b) by 85 days.

(21) Appl. No.: 18/440,532

(22) Filed: Feb. 13, 2024

(51) Int. Cl.
*H04L 9/40* (2022.01)
*G16Y 30/10* (2020.01)

(52) U.S. Cl.
CPC .......... *H04L 63/0892* (2013.01); *G16Y 30/10* (2020.01)

(58) Field of Classification Search
CPC ............................. H04L 63/0892; G16Y 30/10
See application file for complete search history.

(56) References Cited

U.S. PATENT DOCUMENTS

| | | | |
|---|---|---|---|
| 2017/0264639 A1 | 9/2017 | Sama et al. | |
| 2021/0029156 A1 | 1/2021 | Sharifi Mehr | |
| 2021/0359897 A1 | 11/2021 | Shaked et al. | |
| 2024/0205257 A1* | 6/2024 | Divakaran | H04L 63/1433 |
| 2025/0104550 A1* | 3/2025 | Ramesh | G08B 25/00 |

FOREIGN PATENT DOCUMENTS

WO 2017007725 A1 1/2017

OTHER PUBLICATIONS

International Search Report and Written Opinion for Application No. PCT/US2025/015213 mailed on Apr. 18, 2025, 14 Pages.

\* cited by examiner

*Primary Examiner* — Huan V Doan
(74) *Attorney, Agent, or Firm* — DLA PIPER LLP (US)

(57) ABSTRACT

A security system for internet of things (IoT) devices, comprising a security engine server remote from an enterprise where the IoT devices are installed, and a network device installed at the enterprise. The security engine server is configured to receive functionality information of the IoT devices, generate a vendor model of the IoT devices based on the functionality information, the vendor model indicating vendor approved functionality of the IoT devices, receive installation information of the IoT devices, generate an enterprise model of the IoT device installation based on the installation information, the enterprise model indicating enterprise approved functionality of the IoT devices, and control the network device to provide security services to the IoT devices installed at the enterprise based on the vendor model and the enterprise model.

20 Claims, 20 Drawing Sheets

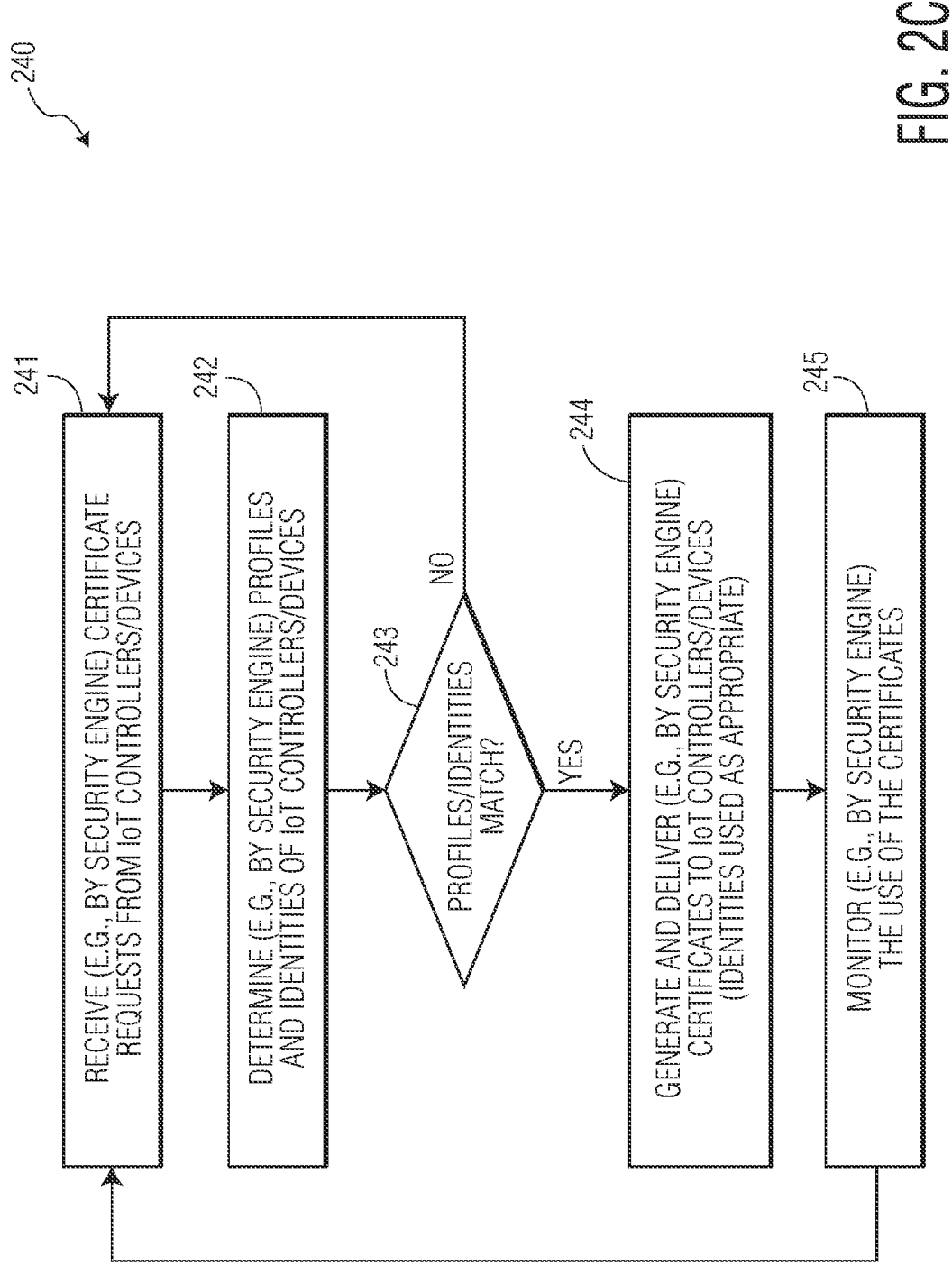

310

General Information
: Sep 14, 2023. 2:49:20 PM v.115 Drew  311
Vendor
Company
Version
ECY
Operating System
Company Linux

Authentication Mechanisms

Application Profiles  312
Application Profiles
Applications included through Network Services
Application
Company BACNet S/C Client: : Jul 5, 2023, 1:18:27 PM v.24 John Doe
Application Profiles
Application Name
Company Building Intelligence 2.0 Web Server: : Jul 6, 2023, 9:57:28 PM v.21 John Doe

Network Services and Associated Applications  313
Network Services
Provided Network Service
Company Building Intelligence 2.0 API: : Jul 5, 2023, 6:37:40 PM v.30 John Doe Consumed  314

Network Service
BACNet S/C: : Aug 1, 2023, 4:42:51 PM v.34 John Doe
Application
Company BACNet S/C Client Network Services
NTP: : Jan 27, 2023, 4:03:47 PM v.1 John Doe Enterprise Metadata

FIG. 3B

Network Protocols ~321

| | OSI L4 Protocol | Consumer Source Port(s) | Provider Destination Port(s) | Sender-Only Approval | Peer to peer | IP Address Constraint |
|---|---|---|---|---|---|---|
| | tcp | * | 443 | false | false | None |
| | tcp | * | 80 | false | false | None | items per page: 25    1–2 of 2

Providers ~322

Company Building Intelligence 2.0 Web Server

Consumers ~323

Company Building Intelligence 2.0 Web Client

| Company Building Intelligence 2.0 Web Client |
|---|

General Information

General Information ← 341
Implementation Vendor
Company

Implementation Version
2.0

☐ SE Agent

Authentication ← 342
Available Authentication Mechanisms
+

| Encryption | Additional Client Authentication |
|---|---|
| mTLS | Username/Password |
| TLS | Username/Password |

⬇
Add SE-Manageable Certificate: ← 343
: Add Certificate
Certificate Profile
Certificate Keystore Locations

| Edit | Details | Clipboard | Deployment Location Differs | Name ↑ | Disabled? | Server Cert | X509 Alg | SSH Alg |
|---|---|---|---|---|---|---|---|---|
| ✎ | ⓘ | ▢ | | WebAPI client | false | false | RSA | 2048 |

⬇

File Monitoring

Process Monitoring

Registry Monitoring

FIG. 3E

Endpoint Authorization ← 411
Authorized

Endpoint Authorization Source
OT

System Configuration ← 412
: Aug 1, 2023, 4:45:08 PM  v.848  John Doe

SE Access
SE BMS Lab Network: : Jan 10, 2023, 1:05:43 PM  v.2  John Doe

SE Access
10.0.0.27

Device Model
ECY-APEX: : Aug 1, 2023, 4:45:08 PM  v.145  John Doe

| Device Model Details |
| Network Services and Associated Applications |
| SE Enrollment and Checkin Schedule |

AAA Controls ← 413

| Certificate Management |
| User Management |

EPP Controls ← 414

| Application Profiles |
| Process Management |
| File Monitoring |
| Registry Monitoring |
| Log Retrieval |

ND Controls ← 415

| Onboard Firewall |

: Aug 1, 2023, 4:45:08 PM  v.145  John Doe   *← 421

Vendor Device Model
ECY-APEX: : Aug 1, 2023, 4:45:08 PM  v.113  John Doe

General Information   *← 422
: Aug 1, 2023, 4:45:08 PM  v.113  John Doe

Vendor
Company

Version
ECY

Operating System
Company Linux

Authentication Mechanisms   *← 423

Application Profiles

Network Services and Associated Applications

Enterprise Metadata

: Jul 6, 2023, 9:57:32 PM  v.41  John Doe

Configured Network Service ← 441

Company Building Intelligence 2.0 AP: : Jul 6, 2023, 9:57:32 PM  v.31  John Doe

Authentication Mechanism ← 442

TLS

Additional Client Authentication ← 443

Username/Password

| User Accounts |
|---|

Trusted Certificate Authority ← 444

BMSLab Company Web API CA

| Server Certificate Rotation Policy |
|---|
| Client Certificate Rotation Policy |
| SSH Key Rotation Policy |

Network Protocols ← 445

| Protocol | Source Port(s) | Destination Port(s) | Sender-Only Approval | Peer to peer | IP Address Constraint |
|---|---|---|---|---|---|
| tcp | * | 443 | false | false | None |
| tcp | * | 80 | false | false | None |

Items per page: 25   1–2 of 2

Providers ← 446

| Company Building Intelligence 2.0 Web Server |
|---|

Consumers ← 447

| Company Building Intelligence 2.0 Web Client |
|---|

FIG. 4E

| Cancel | | | 🗑 Delete |
|---|---|---|---|
| Name ✎ 451 ✎ | | Purpose | ✎ |
| BMSLab Company Web API CA | | Secure access to deployment-wide BACNet S/C | |
| Organization (O) | | | |
| Deployment | | | |
| Location (l) | State (st) | Country (c) | |
| Columbia | MD | US | |
| Int Organization (O) | | | |
| Deployment=Int | | | |
| Int Location (l) | Int State (st) | Int Country (c) | |
| Columbia | MD | US | |
| Root Organization (O) | | | |
| Deployment-Root | | | |
| Root Location (l) | Root State (st) | Root Country (c) | |
| Columbia | MD | US | |
| OCSO URI ✎ 452 ✎ | | | |
| https://52.200.238.198:1515 | | | |
| ☐ Exclude Intermediate CA | | | |
| ☐ Single Root CA | | | |
| Int CA Server CN 453 | | | |
| BMSLabCompanyWebAPIserver-int | | | |
| Int CA Client CN | | | |
| BMSLabCompanyWebAPIclient-int | | | |
| Root CA Server CN | | | |
| BMSLabCompanyWebAPIserver-Root | | | |
| Root CA Server CN | | | |
| BMSLabCompanyWebAPIclient-Root | | | |
| Backups | | | |
| ⬇ CA Backup | | | |
| ⬆ Restore from CA backup | | | |
| ⬆ Upload a Bulk Download Request | ⓘ Show Bulk Request File Format | | |

✎ Edit    Cancel    ← 461

Vendor Device Model
ECY-APEX: : Aug 1, 2023, 4:45:08 PM  v.113  John Doe

---

General Information    ← 462    ⌃

: Aug 1, 2023, 4:45:08 PM  v.113  John Doe

Vendor
Company

Version
ECY

Operating System
Company Linux

---

Authentication Mechanisms    ← 463

---

Application Profiles    ← 465    ⌃

Application Profiles

Applications included through Network Services

Application
Company BACNet Client: Mar 29, 2023, 1:03:20 PM  v.4  Drew

Application
Company BACNet S/C Client: Jul 5, 2023, 1:18:27 PM  v.24  John Doe

Application
Company Building Intelligence 2.0 Web Client: Jul 5, 2023, 2:27:50 PM  v.14  John Doe

Application
Niagra Web Client: Mar 29, 2023, 1:03:44 PM  v.13  Drew

FIG. 4G

SECURITY ENGINE FOR IOT DEVICES

FIELD

A security engine for IoT devices.

BACKGROUND

Internet of things (IoT) devices encompass a wide array of devices that are connected to and communicate via the internet. Due to their connections to the internet, IoT devices are vulnerable to internet-based attacks such as unauthorized access attacks, malware, man-in-the-middle attacks and ransomware to name a few. Conventional IoT device security solutions require end users to install and maintain IoT security measures. This is problematic because this places a burden on the end user and is inefficient due to the use of separate security solutions that are not fully integrated.

SUMMARY

In embodiments, the present disclosure relates to a security system for internet of things (IoT) devices, comprising a security engine server remote from an enterprise where the IoT devices are installed, and a network device installed at the enterprise, wherein the security engine server is configured to receive functionality information of the IoT devices, generate a vendor model of the IoT devices based on the functionality information, the vendor model indicating vendor approved functionality of the IoT devices, receive installation information of the IoT devices, generate an enterprise model of the IoT device installation based on the installation information, the enterprise model indicating enterprise approved functionality of the IoT devices, and control the network device to provide security services to the IoT devices installed at the enterprise based on the vendor model and the enterprise model.

According to any of the above embodiments, the security services comprise network defense (ND) to prevent the IoT devices from communicating with unauthorized devices internal to the network and external to the network.

According to any of the above embodiments, the security engine server is configured to provide end point protection (EPP) as part of the security services, the EPP comprising monitoring the IoT devices for cyberthreats, the EPP is performed by the network device or by an agent installed on the IoT devices.

According to any of the above embodiments, the security engine server is configured to provide authentication authorization and accounting (AAA) as part of the security services, the AAA comprising creating and managing certificate credentials for the IoT devices, the certificate credentials created by a private certificate authority managed by the security engine server.

According to any of the above embodiments, in response to threats detected by the security services, the security engine server is configured to execute network defense (ND) by blocking communications transmitted by the IoT devices or blocking communications to be received by the IoT devices, execute end point protection (EPP) to detect cyberthreats, and execute authentication authorization and accounting (AAA) to provide and mange credentials for the IoT devices.

According to any of the above embodiments, the security engine server is configured to generate the vendor model of the IoT devices by providing a graphical user interface (GUI) comprising vendor selectable options for defining the vendor approved functionality of the IoT devices.

According to any of the above embodiments, the selectable options for defining the vendor approved functionality of the IoT devices comprise options for identifying models of the IoT devices, selecting communication capabilities of the IoT devices, and selecting application profiles of the of the IoT devices.

According to any of the above embodiments, the security engine server is configured to generate the enterprise model of the IoT devices by providing a graphical user interface (GUI) comprising enterprise selectable options for defining the enterprise approved functionality of the IoT devices.

According to any of the above embodiments, the selectable options for defining the enterprise approved functionality of the IoT devices comprise options for identifying roles of the IoT devices, selecting authorized communication behavior of the IoT devices, and selecting a hierarchy of the IoT devices within the enterprise.

According to any of the above embodiments, the security engine server is configured to integrate the security services with existing vendor security services and existing enterprise security services.

In embodiments, the present disclosure relates to a method for executing a security system for internet of things (IoT) devices, the security system comprising a security engine server remote from an enterprise where the IoT devices are installed and a network device installed at the enterprise, the method comprising receiving, by the security engine server, functionality information of the IoT devices, generating, by the security engine server, a vendor model of the IoT devices based on the functionality information, the vendor model indicating vendor approved functionality of the IoT devices, receiving, by the security engine server, installation information of the IoT devices, generating, by the security engine server, an enterprise model of the IoT device installation based on the installation information, the enterprise model indicating enterprise approved functionality of the IoT devices, and controlling, by the security engine server, the network device to provide security services to the IoT devices installed at the enterprise based on the vendor model and the enterprise model.

According to any of the above embodiments, the method comprises executing, by the security engine server, as part of the security services, network defense (ND) to prevent the IoT devices from communicating with unauthorized devices internal to the network and external to the network.

According to any of the above embodiments, the method comprises executing, by the security engine server, as part of the security services, end point protection (EPP), the EPP comprising monitoring the IoT devices for cyberthreats, the EPP is performed by the network device or by an agent installed on the IoT devices.

According to any of the above embodiments, the method comprises executing, by the security engine server, as part of the security services, authentication authorization and accounting (AAA), the AAA comprising creating and managing certificate credentials for the IoT devices, the certificate credentials created by a private certificate authority managed by the security engine server.

According to any of the above embodiments, the method comprises in response to threats detected by the security executing, by the security engine server, network defense (ND) by blocking communications transmitted by the IoT devices or blocking communications to be received by the IoT devices, executing, by the security engine server, end point protection (EPP) to detect cyberthreats, and executing, by the security engine server, authentication authorization and accounting (AAA) to provide and mange credentials for the IoT devices.

According to any of the above embodiments, the method comprises generating, by the security engine server, the vendor model of the IoT devices by providing a graphical user interface (GUI) comprising vendor selectable options for defining the vendor approved functionality of the IoT devices.

According to any of the above embodiments, the method comprises providing, by the security engine server, the selectable options for defining the vendor approved functionality of the IoT devices comprising options for identifying models of the IoT devices, selecting communication capabilities of the IoT devices, and selecting application profiles of the of the IoT devices.

According to any of the above embodiments, the method comprises generating, by the security engine server, the enterprise model of the IoT devices by providing a graphical user interface (GUI) comprising enterprise selectable options for defining the enterprise approved functionality of the IoT devices.

According to any of the above embodiments, the method comprises providing, by the security engine server, the selectable options for defining the enterprise approved functionality of the IoT devices comprising options for identifying roles of the IoT devices, selecting authorized communication behavior of the IoT devices, and selecting a hierarchy of the IoT devices within the enterprise.

According to any of the above embodiments, the method comprises integrating, by the security engine server, security services with existing vendor security services and existing enterprise security services.

BRIEF DESCRIPTION OF THE DRAWINGS

So that the way the above-recited features of the present disclosure may be understood in detail, a more particular description of the disclosure, briefly summarized above, may be made by reference to example embodiments, some of which are illustrated in the appended drawings. It is to be noted, however, that the appended drawings illustrate only example embodiments of this disclosure and are therefore not to be considered limiting of its scope, for the disclosure may admit to other equally effective example embodiments.

FIG. 2C shows a flowchart of IoT security engine authentication, authorization and accounting, according to an example embodiment of the present disclosure.

FIG. 3B shows a GUI screenshot of IoT security engine vendor model generation, according to an example embodiment of the present disclosure.

FIG. 3C shows a GUI screenshot of IoT security engine vendor model generation, according to an example embodiment of the present disclosure.

FIG. 3E shows a GUI screenshot of IoT security engine vendor model generation, according to an example embodiment of the present disclosure.

FIG. 4B shows a GUI screenshot of IoT security engine enterprise model generation, according to an example embodiment of the present disclosure.

FIG. 4C shows a GUI screenshot of IoT security engine enterprise model generation, according to an example embodiment of the present disclosure.

FIG. 4E shows a GUI screenshot of IoT security engine enterprise model generation, according to an example embodiment of the present disclosure.

FIG. 4F shows a GUI screenshot of IoT security engine enterprise model generation, according to an example embodiment of the present disclosure.

FIG. 4G shows a GUI screenshot of IT security engine enterprise model generation, according to an example embodiment of the present disclosure.

DETAILED DESCRIPTION

Figure 1A:
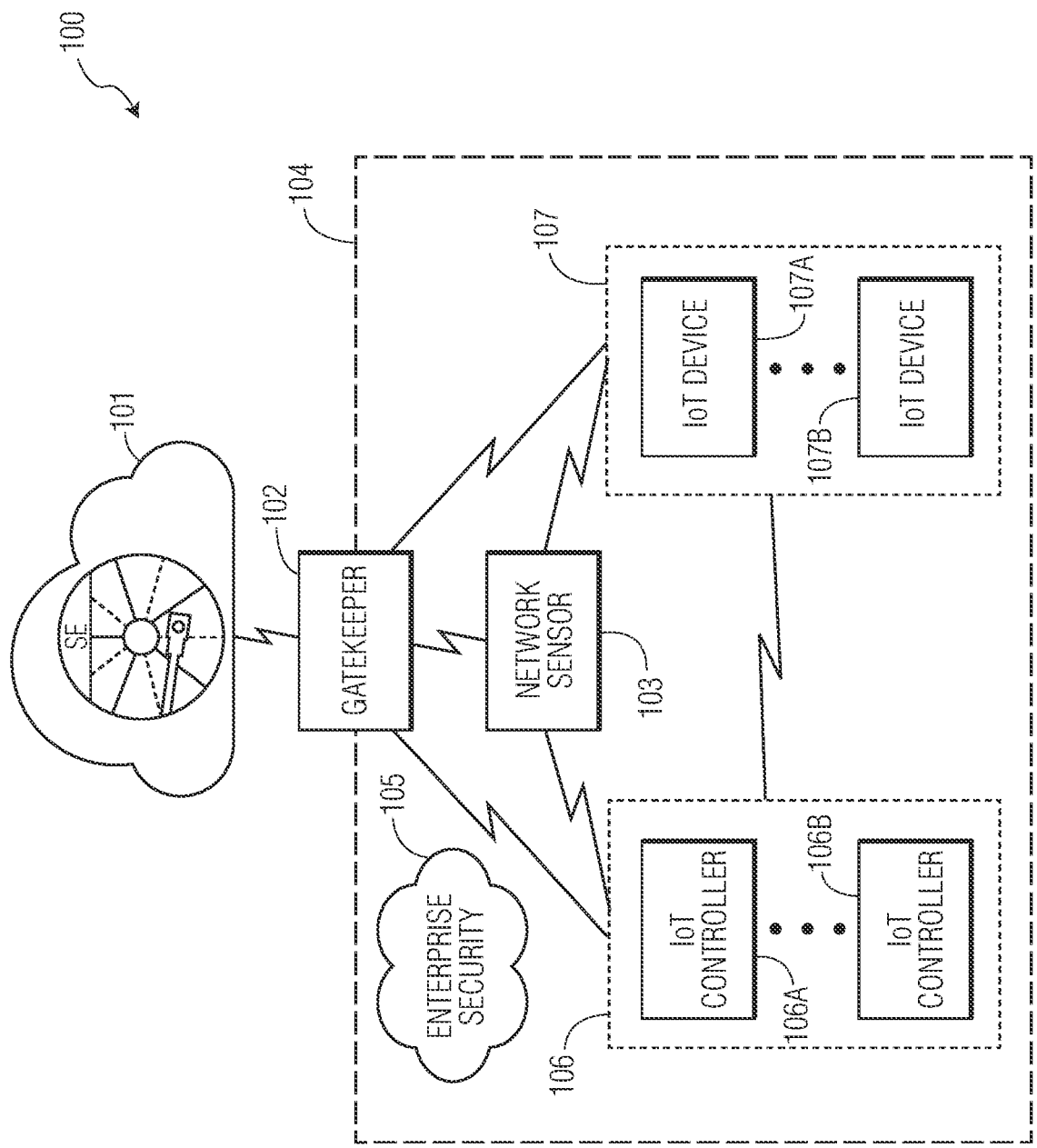
FIG. 1A shows a diagram of an IoT security system, according to an example embodiment of the present disclosure.

Various example embodiments of the present disclosure will now be described in detail with reference to the drawings. It should be noted that the relative arrangement of the components and steps, the numerical expressions, and the numerical values set forth in these example embodiments do not limit the scope of the present disclosure unless it is specifically stated otherwise. The following description of at least one example embodiment is merely illustrative in nature and is in no way intended to limit the disclosure, its application, or its uses. Techniques, methods, and apparatus as known by one of ordinary skill in the relevant art may not be discussed in detail but are intended to be part of the specification where appropriate. In all the examples illustrated and discussed herein, any specific values should be interpreted to be illustrative and non-limiting. Thus, other example embodiments may have different values. Notice that similar reference numerals and letters refer to similar items in the following figures, and thus once an item is defined in one figure, it is possible that it need not be further discussed for the following figures. Below, the example embodiments will be described with reference to the accompanying figures.

IoT devices are becoming more prevalent in various residential, commercial and industrial settings across various industries. For example, in the heating ventilation and air conditioning (HVAC) industry, solutions may include installation of IoT devices in the form of automated air conditioning (AC) registers controlled by an IoT controller to open and/or close based on sensed temperatures and schedules within various zones within a building. In this example, the IoT controller and IoT registers are vulnerable to various attacks simply due to their connection to the internet. For example, an unauthorized user (bad actor) could highjack the IoT controller and/or registers via the internet connection and begin controlling the controller and/or registers in an unauthorized manner.

Conventional IoT piecemeal security solutions are inadequate and burdensome, potentially leaving exposed vulnerabilities, especially given the various types of IoT devices and configurations that are possible along with limitations on computational capability of the devices as compared to personal computers and smart devices. In other words, IoT devices may not have the computational capability to execute complex software. In order to properly secure such complex IoT systems, the solution disclosed herein offers a fully integrated security solution that provides a mechanism for end users to easily create, install and execute a full suite of security measures for any IoT device configuration. More specifically, the solution provides a security engine that oversees all security measures including proactive and reactive measures, orchestrates and enforces security measures. These security measures may include, but are not limited to, network defense (ND), endpoint protection (EPP) and authentication authorization and accounting (AAA) which may be easily integrated into IoT controllers, devices or special hardware for a given enterprise configuration (i.e., installation location). Configuration of ND, EPP, and AAA solutions may be generated by the security engine using a common vendor model and a common enterprise model.

The IoT security solution may include a security engine residing on a server or in the cloud, and at least one special network hardware device residing at the enterprise location (i.e., installation location). The IoT security engine provides an intuitive graphical user interface (GUI) that allows vendors and enterprises to easily define vendor models and enterprise models. The vendor model may include vendor approved parameters/functionality of vendor IoT devices (e.g., type of device, communication capabilities of device, existing security features, access controls, servers, etc.), whereas the enterprise model may describe enterprise approved behavior/functionality of how each IoT device is being installed and utilized at the enterprise, what services the device provides or consumes, how interfaces are protected and authenticated/authorized, and how each IoT device should be monitored at the enterprise. In other words, vendors can create models for their IoT devices, and enterprises can create models of how these vendor devices are to be installed and utilized in a given location. These models allow the IoT security engine to fully understand the capabilities and installation requirements of each IoT device, and to use this understanding to develop, deploy and execute an optimal IoT security.

For example, a vendor (i.e., IoT product manufacturer) may request to integrate IoT security solution into their IoT products (e.g., HVAC equipment which may include automatic registers and a controller for controlling operation of the automatic registers based on temperature monitored by a thermostat). The vendor may populate vendor model by specifying vendor approved parameters/functionality of the IoT products (e.g. controller, automatic register, thermostat, etc.). An Enterprise may then install vendor equipment onsite. During installation, the enterprise may populate an enterprise model based in part on the vendor model and by specifying how each IoT device is being used and how each IoT device should be monitored on premises. Once the models are complete, the IoT security solution may use one or more special external hardware devices, and possibly software (e.g., agents) installed on the IoT products themselves, to provide IoT devices with a full suite of security. Cyberthreats may be passively detected and reported and/or actively halted before harm can occur.

Benefits of the disclosed methods, devices and systems described herein include but are not limited to ease of implementation and full integration of various security measures. For example, providing a GUI for allowing vendors and enterprises to model their IoT devices and installation configurations provides an easy mechanism for vendors to integrate the security solution in their IoT products, and for enterprises to optimize the security solution for a particular installation configuration. In addition, integrating various security measures such as network defense, endpoint protection and authentication authorization and accounting into a single security system provides a comprehensive security solution that avoids the potential security gaps and maintenance complexity present in piecemeal applications of currently available but unintegrated security technologies.

FIG. 1A shows a diagram 100 of an IoT security system including IoT security engine 101 and an enterprise 104 (i.e., installation location) where various vendor IoT hardware devices are installed. Specifically, enterprise 104 may include IoT controllers 106 such as IoT controllers 106A, 106B, etc., and IoT devices 107 such as 107A, 107B, etc. installed in a building. In one example, IoT controllers 106 may be HVAC controllers, while IoT devices 107 may be HVAC units (e.g., automatic vents, AC/Heater units, etc.). Also included at enterprise 104, are one or more additional hardware devices including gatekeeper 102 and network sensor 103. These additional devices may be provided as part of the overall security solution.

Installation of the hardware at enterprise 104 may include installing the IoT controllers 106 and IoT devices 107 depending on a desired installation configuration. The installation may include the physical placement, wiring and setup of the IoT controllers 106 and IoT devices 107 at desired locations within enterprise 104. Installation according to the disclosed solution also includes connecting the IoT controllers 106 and IoT devices 107 to IoT security engine 101 via additional dedicated hardware devices that may include gatekeeper 102 and network sensor 103. It is noted that although gatekeeper 102 and network sensor 103 are shown as separate devices, they may be integrated into the same device which essentially acts as a gateway for sensing and controlling communications between IoT controllers 106, IoT devices 107 and any devices external to the enterprise, such as IoT security engine 101 which may be in the cloud.

Security software may be executed on various devices including gatekeeper 102, network sensor 103 and possibly on IoT controllers 106 and IoT devices 107 themselves. It is noted that installation of security software on IoT controllers 106, IoT devices 107 is beneficial but is not necessary to provide IoT security to enterprise 104. It is also noted that enterprise 105 may or may not already have some existing security features (e.g., firewall, etc.) in place to protect IoT controllers 106 and IoT devices 107. However, this is not problematic, as the solution disclosed herein may work independent of or in conjunction with any legacy enterprise security features.

As mentioned above, IoT controllers 106 and IoT devices 107 may or may not have the security software installed thereon. In one example, the security software may be installed on IoT controllers 106 and IoT devices 107 either by the vendor prior to installation or by the security solution during installation. For example, once installed, security engine 101 may push security software to the IoT devices and/or IoT controllers via gatekeeper 102 and network sensor 103. The security software may or may not include software agents for enhancing security measures.

Within enterprise 104, some or all of the IoT controllers 106 and IoT devices 107 may include software agents installed thereon. Operation of the security system generally depends on whether the IoT controllers 106 and IoT devices 107 include software agents. For devices that do not include software agents, security engine 101 may still provide agentless solutions such as EPP and/or AAA by leveraging security APIs built into IoT controllers 106 and IoT devices 107. For devices that include software agents, the security functionality is improved, as security engine 101 may utilize agents to provide more dynamic and proactive EPP and/or AAA security functions. Regardless of whether IoT controllers 106 and IoT devices 107 include EPP/AAA functionality via APIs or agents, gatekeeper 102 and network sensor 103 provide ND at a minimum where network communications in/out of enterprise 104 are monitored and controlled at the gatekeeper and network sensor.

In the disclosed security system, the communication pathways for IoT controllers/devices may be different based on the presence or absence of software agents. For example, IoT controllers/devices equipped with software agents may have the capability to communicate directly with the gatekeeper. This direct communication channel allows for enhanced security measures and more dynamic interactions. On the other hand, IoT devices that do not have software agents installed may communicate directly with the network sensor. Despite the difference in communication pathways, it is noted that both the gatekeeper and the network sensor are designed to be aware of these communications. This ensures that all communications within the security system are monitored, thereby enhancing the overall security of the IoT controllers/devices.

Figure 1B:
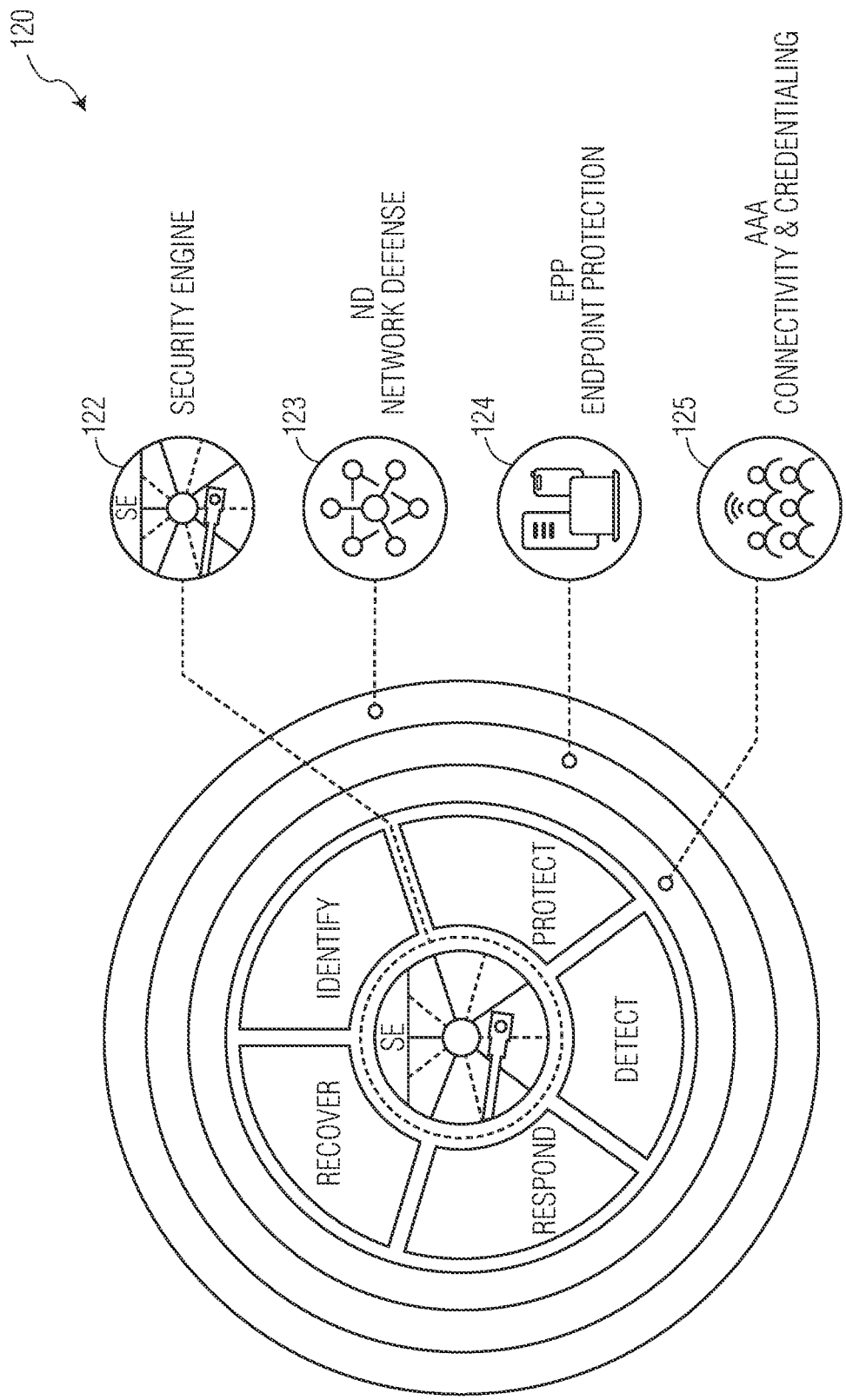
FIG. 1B shows a diagram of an IoT security engine, according to an example embodiment of the present disclosure.

FIG. 1B shows a diagram 120 of an IoT security engine 122 having various network security features. These features include but are not limited to ND, EPP and AAA. ND 123 provides network defense such as monitoring traffic in and out of enterprise 104 and performing functionality such as traffic filtering, firewall protection, intrusion detection and prevention, policy-based access control at the network level and more. ND 123 is also designed to alert the end user in case of any potential threats or breaches. The alert capabilities of the ND are designed to notify the end user in real-time when it detects any suspicious activities or potential threats. The alert capabilities can be configured to send notifications via various channels such as email, SMS, or push notifications to the user's device. The alerts provide detailed information about the detected threat, including the type of threat, its source, and the affected areas of the network. This allows the end user to take immediate action to mitigate the threat and protect the network.

EPP 124 provides end-point-protection such as anti-virus protection, malware protection, behavior logging at the end point level and more. AAA 125 provides strong multi-parameter device identities backed via credentialing via certificate credentials, and authorization/authentication functionality. One or more of ND, EPP and AAA may be facilitated by security engine 122 based on the capabilities of the IoT controllers and devices. Security engine 122 facilitates ND, EPP and AAA solutions by configuring the aforementioned devices (e.g., gatekeeper, network sensor, IoT devices, IoT controllers, etc.) to perform the ND, EPP, and AAA. This configuration process involves setting up the devices with the appropriate software or protocols that enable them to perform the ND, EPP, and AAA functions. This could involve installing specific software (e.g., agents), setting up network rules, or defining access controls, among other tasks. When all three of the ND, EPP and AAA solutions are employed, the security engine 122 provides a comprehensive security platform that monitors and protects both IoT controllers and IoT devices from various forms of security attacks. In other words, once the devices have been configured with the ND, EPP, and AAA solutions, security engine 122 works in conjunction with these devices to provide comprehensive security solutions. This means that the security engine 122 communicates with these devices, coordinating their activities and ensuring that they work together effectively to detect network threats, protect endpoints, and manage authentication, authorization, and accounting. This collaborative approach enhances the overall security of the network and the devices connected to it. In other words, if the solutions below describe the security engine performing a specific function, it is noted that the function may be performed by the security engine alone, or the function may be performed by the security engine in conjunction with one or more network devices (e.g., gatekeeper, network sensor, IoT devices, IoT controllers, etc.). For example, the one or more network devices may monitor behavior within the network and act on this behavior based on software previously provided by the security engine. The one or more network devices may also report this behavior to the security engine which may then provide further instructions to the one or more network devices for reacting to the actions and/or may provide feedback to the end user.

The device identities may leverage immutable IDs, including but not limited to system unique IDs provided by the security engine, device unique IDs (e.g., device serial number), which may be delineated in the vendor and enterprise models and incorporated into the certificate credentials. The device identities may also leverage mutable IDs, such as a media access control (MAC) addresses, IP addresses and the like, which may also be employed as additional identifiers, as defined within the models. This dual-ID strategy, utilizing both immutable and mutable identifiers, is designed to approximate the security assurance of a built-in hardware root of trust. When available, this hardware root of trust can serve as the foundational device ID, providing a secure anchor for device identity verification. In other words, these IDs can be monitored and verified by the security engine during operation of the devices.

For example, during the initial setup or enrollment of an IoT device, the security engine may record the device's immutable ID, such as a system unique ID or the device unique ID. This immutable ID is then embedded within the device's certificate credentials. The security engine uses this immutable ID to verify the device's identity whenever it communicates within the network. For instance, when an IoT device attempts to connect to the network, the security engine checks the presented certificate against the known immutable ID in the vendor or enterprise model. If the certificate's embedded ID matches the expected immutable ID, the device is considered authentic and allowed to communicate. This process ensures that even if a bad actor clones the device's mutable ID, such as its IP or MAC address, they cannot replicate the immutable ID, which is often burned into the device's hardware and is not alterable. Mutable IDs, like MAC and IP addresses, are used for network-level identification and communication. The security engine uses them in conjunction with immutable IDs for additional context and security checks. For example, if the security engine detects a known device's MAC address attempting to connect from an unusual IP range or executing unexpected network behavior, it can flag this as suspicious. The security engine may then challenge the device for further authentication, check for recent security incidents involving similar patterns, or compare the behavior against the device's profile in the enterprise model.

In one example, the security engine might operate as follows. An IoT device initiates communication with the network. The security engine intercepts this communication and extracts both the immutable ID from the device's certificate and the mutable ID from the network packet (e.g., MAC address). The security engine compares the extracted IDs against the expected IDs in the vendor and enterprise models. If the immutable ID matches but the mutable ID does not fit the device's typical pattern (e.g., wrong subnet or IP range), the security engine may take additional steps to verify the device's integrity, such as requesting additional authentication tokens or temporarily restricting the device's network access until further verification can occur. If both IDs match expected patterns, the device may be considered secure, and normal communication is allowed to proceed. If the immutable ID does not match, the device may be considered compromised or counterfeit, and immediate action is taken to isolate the device and alert security personnel. By using both immutable and mutable IDs, the security engine provides a robust mechanism to detect and respond to potential security threats, ensuring that IoT devices within the network remain secure and uncompromised.

Figure 1C:
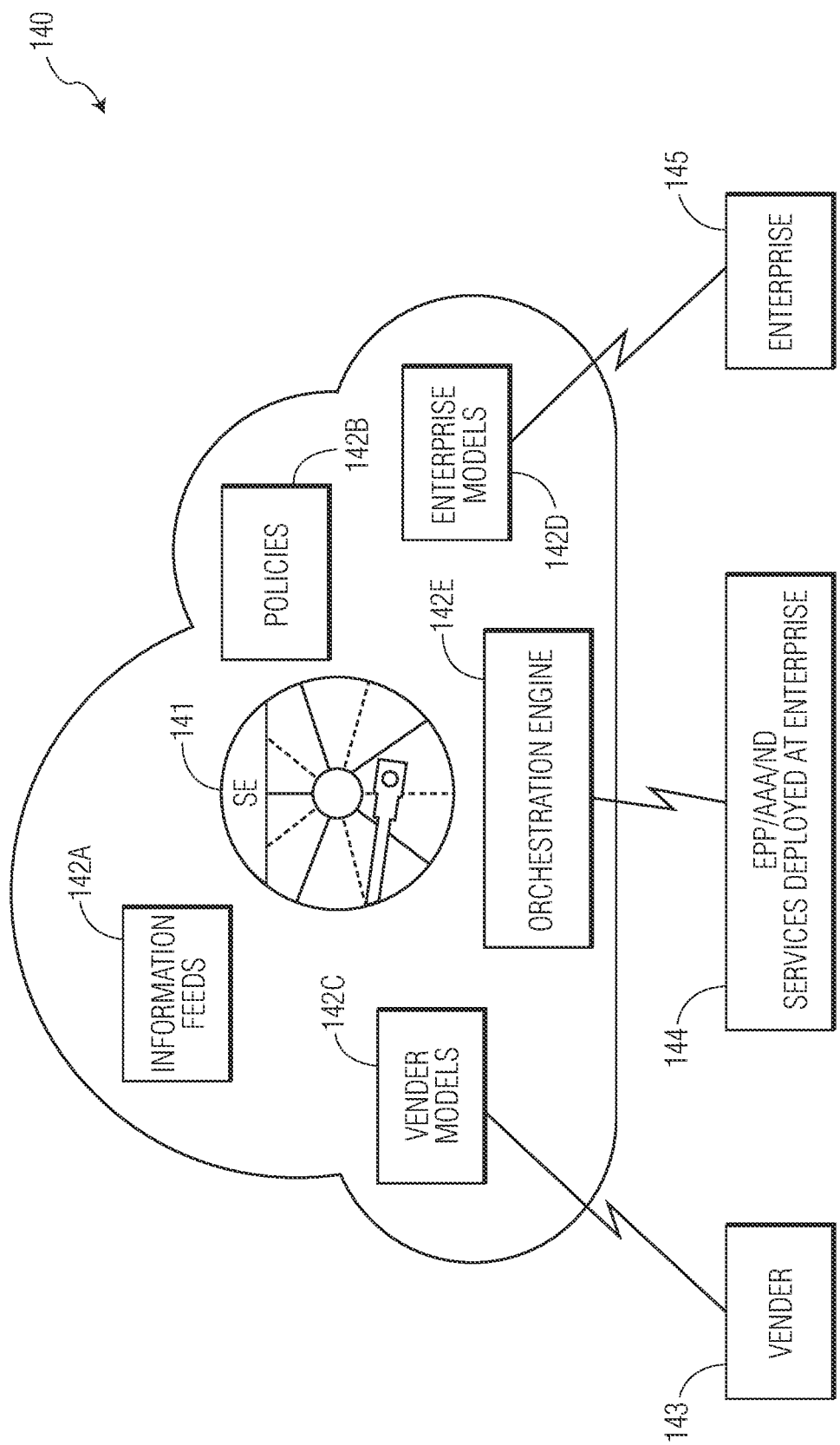
FIG. 1C shows a diagram of an IoT security engine communicating with other entities, according to an example embodiment of the present disclosure.

In order to ensure that the security engine can provide effective security measures to enterprise 104, the functionality of both the IoT controllers/devices and their installation configuration may be considered. FIG. 1C shows a diagram 140 of an IoT security engine communicating with other entities to determine functionality of both the IoT controllers/devices and their installation configurations. Specifically, security engine 141 develops what are referred to herein as vendor models and enterprise models. In general, vendor models are models that describe the functionality/capabilities of IoT controllers/devices, whereas enterprise models are models that describe the installation configuration of the IoT controllers/devices.

The vendor model within the security system effectively serves as a comprehensive whitelist of trusted devices, meticulously detailing the vendor-approved functionalities of Internet of Things (IoT) devices. This model encapsulates the legitimate capabilities and behaviors expected from each device as specified by the manufacturer. By generating a vendor model based on precise functionality information, the security engine server establishes a baseline of authorized device characteristics, including models, communication capabilities, and application profiles. This whitelist approach ensures that any deviation from the vendor-defined parameters is swiftly identified, enabling the security system to detect and respond to unauthorized modifications or potential security breaches that could compromise the integrity of the IoT ecosystem. Complementing the vendor model, the enterprise model acts as a whitelist of trusted device behavior within the specific operational context of an enterprise's IoT installation. This model is tailored to reflect the enterprise-approved functionality of the IoT devices, taking into account the roles, authorized communication behaviors, and hierarchical structure of the devices as they are deployed within the enterprise. By leveraging the enterprise model, the security engine server can enforce security policies that align with the enterprise's expectations and usage patterns, ensuring that the IoT devices operate within the defined boundaries. This not merely fortifies the network against external threats but also provides a safeguard against internal misuse, thereby maintaining a secure and controlled IoT environment.

A benefit of the security solution lies in its streamlined approach, utilizing a common (e.g., single) Vendor Model and a common (e.g., single) Enterprise Model to drive security functionalities, thereby simplifying the configuration and setup process. By consolidating security measures into a unified framework, the system reduces the complexity typically associated with configuring multiple security layers separately. This not only ensures a more efficient deployment but also enhances the overall security posture by eliminating potential gaps between disparate systems. The result is a robust, cohesive security strategy that is both easier to manage and more effective at protecting the IoT infrastructure against a wide array of cyber threats.

It should be noted that while the security solution is described to operate with a single Vendor Model and a single Enterprise Model, it also offers the flexibility to accommodate multiple models if the scenario demands. In complex enterprise environments where IT devices from various vendors with different functionalities are deployed, or in cases where distinct operational segments within an enterprise require tailored security measures, the system can support multiple Vendor and Enterprise Models. This adaptability ensures that the security engine can provide nuanced and granular security services that cater to the specific requirements of each segment or device type. By allowing for the use of multiple models, the security solution can maintain its comprehensive coverage across diverse and intricate IoT ecosystems, ensuring that all devices and their respective behaviors are appropriately whitelisted and monitored for any deviations from their approved functionalities.

Creation of the vendor models and enterprise models are facilitated by GUI that populated by the entity (i.e., vendor or enterprise) creating the model. In general, a product specialist or the like from vendor 143 creates the vendor model 142C, while an installation specialist or the like from enterprise 145 creates the enterprise model 142D. Once the models are created, security engine 141 utilizes these models along with information feeds 142A and policies 142B to deploy and execute security measures at the enterprise 144. Security engine 141 may utilize software in the form of an orchestration engine 142E that supports the deployment, execution and management of the security services (e.g., ND, EPP and AAA) at the enterprise. In other words, orchestration engine 142E may use the models to generate security policies 142B and then monitor communications and behavior of the IoT devices via information feeds 142A to determine when and how to intervene in the operation of the IoT devices.

It is noted that in other examples, the security engine's capabilities for creating vendor and enterprise models via the GUI may be augmented with advanced methods such as automated profiling and artificial intelligence (AI)-based learning modules. Automated profiling can streamline the model creation process by dynamically collecting device data and operational parameters during initial setup or regular operation. This data, which may include usage patterns, network traffic characteristics, and typical communication behaviors, can be automatically analyzed to populate relevant sections of the vendor and enterprise models, reducing manual input and the potential for human error. AI-based learning modules executed by the security engine can further refine the security engine's effectiveness by continuously analyzing the IoT environment and adapting to new security threats. These modules can employ machine learning algorithms to detect deviations from normal device behavior, predict potential vulnerabilities, and suggest updates to the models to preemptively counteract emerging threats. Over time, the AI can identify patterns indicative of sophisticated cyberattacks, enabling the security engine to implement proactive defenses. As the AI modules learn from the network's evolving security landscape, they can provide recommendations for model adjustments, ensuring that the security measures in place are both current and comprehensive.

To provide an overview of the entire model building and security execution process, consider an HVAC example where a vendor produces automatic HVAC registers (IoT device) that may be controlled to open/close based on instructions received from HVAC controllers (IoT controller). Upon the vendor determining that they would like to incorporate the disclosed security system in their IoT devices/controllers, the vendor may access a vendor model GUI supported by security engine 141. The vendor model GUI may provide templates of devices that the vendor can choose from. These templates may then be customizable by the vendor entering various pieces of information pertaining to the functionality/capabilities and roles of the IoT devices/controllers. The functionality/capabilities may include communication and processing capabilities (e.g., connectivity, sensors/actuators, processing power, memory usage, power consumption, actual processes and fingerprints of the processes that run on the devices, etc.) of the IoT devices/controllers, roles that describe permissions of users or other devices that access the device, and may include how the IoT devices and controllers are expected to interact with each other and other devices via network services (e.g., the ports and protocols along with network security and authentication models, used by controllers send to instructions; and registers to receive instructions). Once the vendor model is created, it may be utilized by the enterprise during installation as described below.

The security engine maintains a comprehensive understanding of the software processes and versions running on IoT devices by referencing the detailed specifications outlined in the vendor model. This model includes a manifest of authorized software, including firmware and application versions, that are approved by the vendor for use on the devices. The security engine leverages this information to configure the EPP.

Upon the enterprise determining that they would like to install the vendor IoT devices/controllers on premises, the enterprise may purchase and install the devices/controllers. During installation, the enterprise may access an enterprise model GUI supported by security engine 141. The enterprise model GUI may allow the enterprise to select vendor IoT devices/controllers and provide templates of installation configurations that the enterprise can choose from. These templates may then be customizable by the enterprise entering various pieces of information pertaining to the installation configuration of the IoT devices/controllers. The information may include indications of which specific sets of IoT devices and controllers are supposed to interact with each other and other devices once installed (e.g., only an allowed controller can send instructions to specific registers which report operational state and other parameters back to the controller).

Once the vendor models and enterprise models are created, they may be used by the security engine to monitor and control security of the IoT controllers/devices located on premise of the enterprise. Examples of the execution of these security measures including ND, EPP and AAA are described below.

Figure 2A:
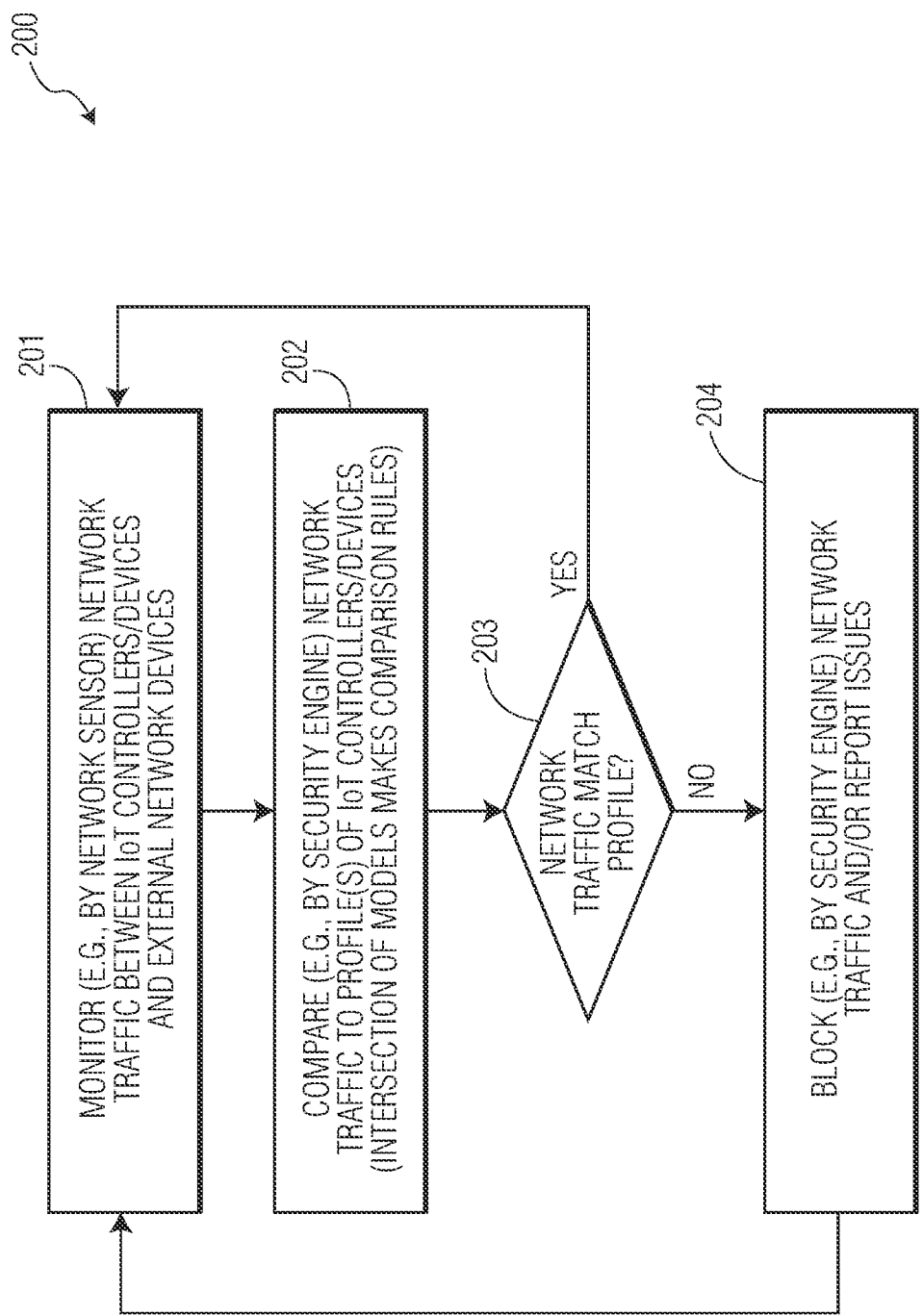
FIG. 2A shows a flowchart of IoT security engine network defense, according to an example embodiment of the present disclosure.

FIG. 2A shows a flowchart 200 of IoT security engine network defense referred to as ND. In step 201, one or more devices (e.g., network sensor and/or gatekeeper) monitor (e.g., via the network sensor) network traffic between the IoT controllers/devices and external network devices. In step 202, the one or more devices compares the network traffic to profiles of the IoT controllers/devices. If, in step 203, the network traffic matches the profile (i.e., is as expected according to the models), then then no action may be needed and monitoring of network traffic continues. If, however, the network traffic does not match the profile (i.e., the controllers or devices are communicating in a manner in which they are not authorized or with IoT devices not authorized), then the one or more devices (e.g., gatekeeper device) blocks and/or reports unauthorized network traffic (i.e., communications) to the security engine in step 204.

Figure 2B:
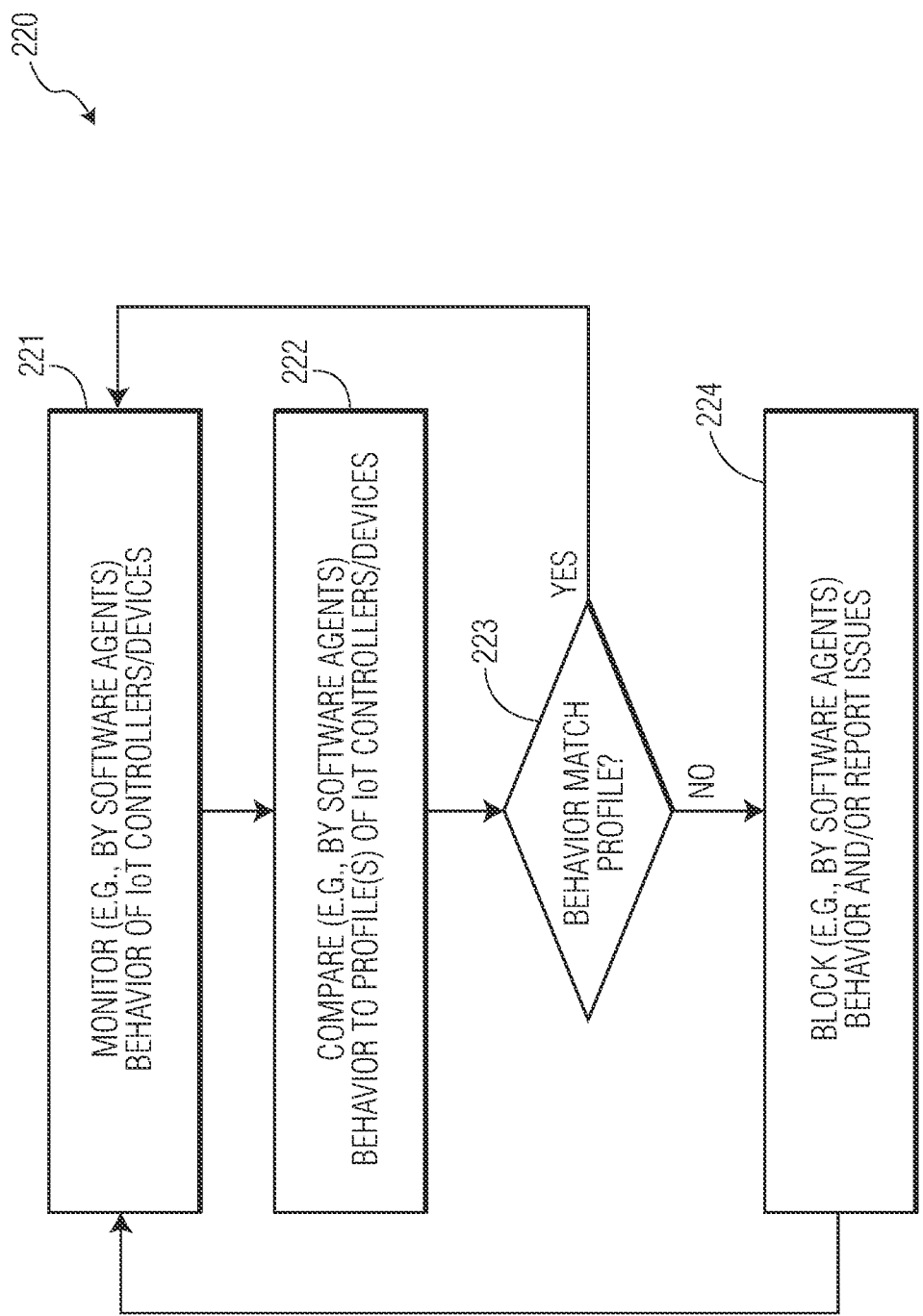
FIG. 2B shows a flowchart of IoT security engine end point protection, according to an example embodiment of the present disclosure.

FIG. 2B shows a flowchart 220 of IoT security engine end point protection referred to as EPP. In step 221, the one or more devices (e.g., IoT devices and/or IoT controllers) monitor (e.g., via software or software agents) the behavior (e.g., communications, tasks being processed, etc.) of the IoT controllers/devices. In step 222, the one or more devices compare this behavior to profiles of the IoT controllers/devices. Again, these profiles are based on intersections of the vendor model and enterprise model. If, in step 223, the behavior matches the profile (i.e., is as expected according to the models), then then no action may be needed and monitoring of device behavior continues. If, however, the network traffic does not match the profile (i.e., the controllers or devices are behaving in a manner in which they are not authorized), then the software agents on the one or more devices block and/or report unauthorized behavior to the security engine in step 224.

FIG. 2C shows a flowchart 240 of IoT security engine authentication referred to as AAA. In step 241, the security engine receives certificate requests from the IoT controllers/devices. In step 242, the security engine determines profiles and identities of the IoT controllers/devices. Again, these profiles and identities are based on the vendor model and enterprise model. If, in step 243, the profiles/identifies do not match (i.e., are not as expected according to the models), then certificates are not generated. If, however, the profiles/identifies match (i.e., profiles/identities are legitimate), then the security engine acting as a private certificate authority (CA) generates and delivers certificates to the IoT controllers/devices in step 244. It is noted that delivery of the certificates can be accomplished via multiple methods. For example, delivery may be accomplished via the IoT controller/device API, or via a software agent of the controller/device if one is present. These two methods provide flexibility in the delivery of certificate credentials, ensuring that AAA procedures can be effectively implemented across a wide range of IoT devices. Then, in step 245, the security engine monitors the use of the certificates (i.e., monitors how the controllers/devices utilize the certificates to perform secure and authenticated communications). For example, the devices (e.g., IoT controllers, IoT devices, etc.) may utilize the certificates to perform authenticated communications. The use of incorrect certificates may be reported to the security engine and/or used to block communications of particular devices.

As described above with respect to FIGS. 2A-2C, the IoT security system compares the behavior of the IoT controllers/devices to profiles dictated by the vendor model and enterprise model. The profiles generally indicate how the devices should be behaving according to the restrictions in the models. For example, the profiles may indicate that the IoT controllers are designed to send instructions to the IoT devices, and that the IoT devices are to send data in response to these instructions (not vice versa). In other words, behavior to the contrary would not fit the profile (e.g., the IoT devices attempt to send instructions to the controller or other IoT devices). This type of unwarranted behavior would be identified, reported and possibly blocked.

When the security engine identifies a running process on an IoT device that does not align with the established profile in the vendor model, it may raise a red flag, indicating a potential security breach such as malware infiltration. The security engine's monitoring system is designed to work in conjunction with the one or more network devices to detect such anomalies by cross-referencing active processes against a predefined list of legitimate software components and their expected behaviors. Upon detecting an unauthorized or suspicious process, indicative of malware or a compromised device, the security engine swiftly moves to isolate the threat. It may achieve this instructing the one or more network devices to block the execution of the process in question, thereby containing the potential damage. Concurrently, the security engine may generate an alert to notify network administrators of the incident, providing them with detailed information to initiate a thorough investigation. In addition to immediate reporting and blocking of unauthorized processes, the security engine can be configured to initiate automated mitigation strategies. These strategies may include quarantining the affected device to prevent the spread of malware across the network, initiating a secure rollback to a previous known good state, or triggering an in-depth scan to root out and remove the malicious code. The engine's response is not just reactive but also adaptive, as it can update the device's security profile within the enterprise model to reflect the newly identified threat. This continuous learning approach ensures that the security engine evolves in tandem with the threat landscape, enhancing the overall resilience of the IoT infrastructure against future malware attacks.

As mentioned above, the vendor model allows the vendor to easily create a model of their IoT controllers/devices that can then be used by the security engine to create effective security measures for a given IoT controller/device. Generation of the vendor model is now described in more detail with respect to the vendor model GUI.

Figure 3A:
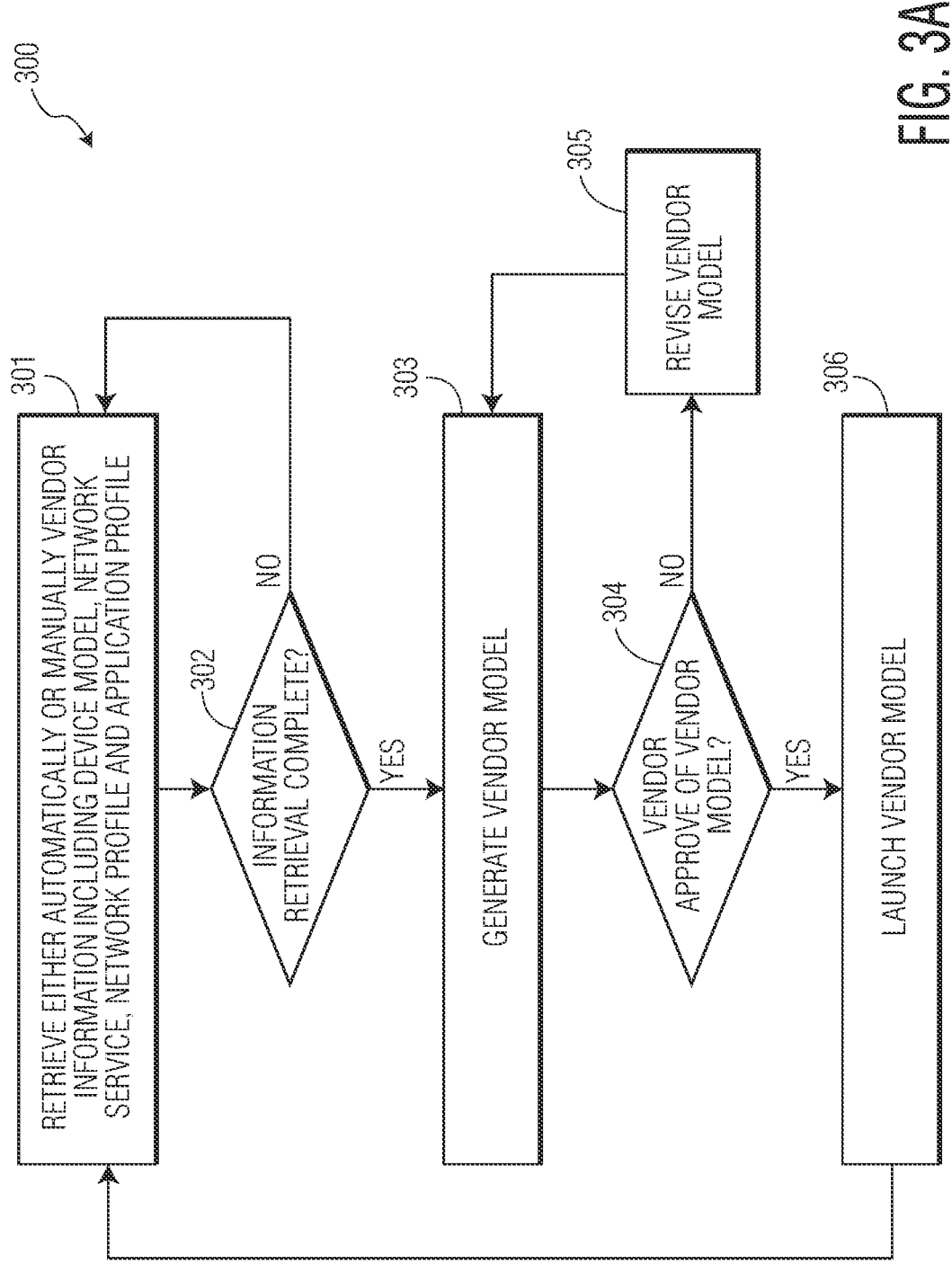
FIG. 3A shows a flowchart of IoT security engine vendor model generation, according to an example embodiment of the present disclosure.

FIG. 3A shows a flowchart 300 of IoT security engine vendor model generation. In step 301, the security engine retrieves the vendor IoT product information (e.g., device model, network service, network profile, application profile, etc.) either automatically or manually from the vendor representative via the vendor model GUI. If the vendor IoT product information is complete in step 302, the security engine generates the vendor model in step 303. Once generated, the vendor model is reviewed by the vendor representative for accuracy in step 304. If the vendor model is not accurate, then the vendor representative revises the vendor model in step 305 and the vendor model is regenerated. If the vendor model is accurate, then the security engine launches the vendor model in step 306 which may include making the vendor model accessible for selection by the enterprise.

FIG. 3B shows a screenshot 310 of IoT security engine vendor model generation. In this screenshot, the vendor model GUI includes entries for general information 311 (e.g., vendor name, operating system, etc.), application profiles 312 (e.g., client, web server profiles, etc.), network services 313 (e.g., application programming interface (API), etc.) and consumers 314 (e.g., building automation and control networks, etc.) for the IoT controller/device in question. The vendor model graphical user interface (GUI) is designed to capture a wide range of detailed information that defines the operational parameters and security profiles of IoT devices. In the enhanced interface, the section for general information 311 is expanded to include not just the vendor's name and operating system, but also firmware versions, device models, and specific hardware configurations. The application profiles 312 area allows vendors to specify the roles and expected behaviors of their devices in various contexts, such as client or server modes, and to detail the security protocols each application adheres to. These profiles may include exactable binary file fingerprints for "allowed" processes, they include information about device identity including immutable IDs such as onboard serial number or external inventory number, mutable IDs, and I/O information about what directories are writable and which are protected, authentication information. Network services 313 entries are enriched to encompass a comprehensive list of services the device offers or consumes, including detailed API endpoints, service ports, and communication protocols, ensuring that the security engine in conjunction with the one or more network devices can accurately monitor and validate device interactions. Lastly, the consumers 314 field is designed to capture information about the systems and networks that will interface with the IoT device, including compatibility with building automation and control networks, which enables the security engine to anticipate and protect against potential vulnerabilities in device interactions.

FIG. 3C shows another screenshot 320 of IoT security engine vendor model generation. In this screenshot, the vendor model GUI includes entries for network protocols 321 (e.g., transmission control protocol (TCP), etc.), providers 322 (e.g., web server, etc.) and consumers 323 (e.g., client, etc.) for the IoT controller/device in question. In the vendor model GUI, the section for network protocols 321 is elaborated to include a comprehensive list of supported protocols beyond the basic TCP. This includes detailed configurations for each protocol, such as specific versions, security enhancements, and custom settings that are particular to the IoT device's communication requirements. The providers 322 entry is designed to capture intricate details about the services offered by the IoT device, such as web server capabilities, including supported request methods, authentication mechanisms, and data exchange formats. For the consumers 323 section, the GUI allows for an in-depth specification of the expected consumer interactions, detailing the types of client devices and systems that will communicate with the IoT device, their communication patterns, and the security measures in place to validate and secure these interactions. This detailed information ensures that the security engine can construct a precise and robust security profile for each IoT device, enabling accurate monitoring and protection against unauthorized access and potential security threats.

Figure 3D:
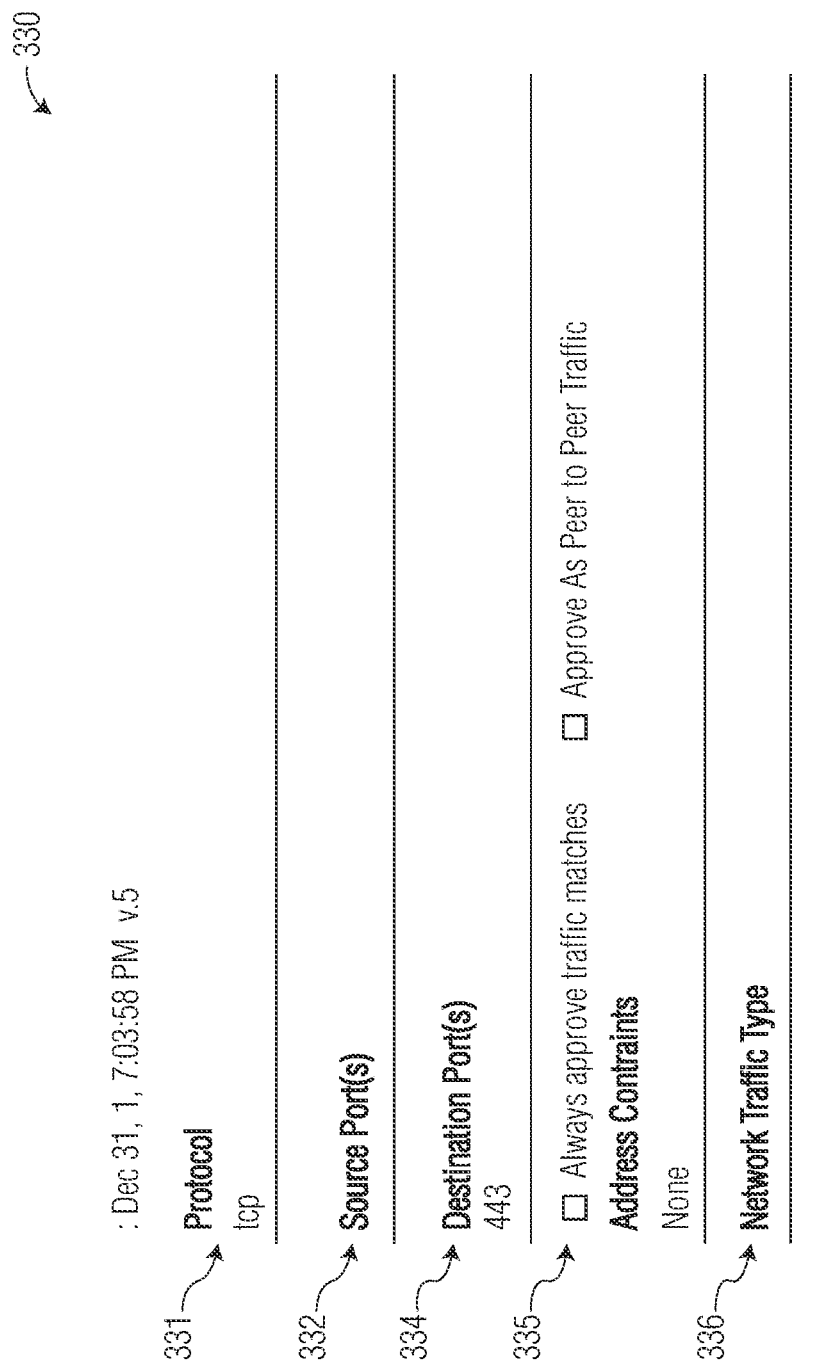
FIG. 3D shows a GUI screenshot of IoT security engine vendor model generation, according to an example embodiment of the present disclosure.

FIG. 3D shows another screenshot 330 of IoT security engine vendor model generation. In this screenshot, the vendor model GUI includes entries for protocols 331 (e.g., TCP, etc.), source ports 332, destination ports 334, address constraints 335 and network traffic type 336 for the IoT controller/device in question. The vendor model GUI provides an intricate framework for defining the network parameters of IoT devices, ensuring a robust security posture. Within this interface, the protocols section 331 is expanded to encompass not just standard protocols like TCP, but also additional protocols utilized by the device, including but not limited to UDP, ICMP, and any proprietary protocols developed by the vendor. The source ports 332 and destination ports 334 fields allow for precise delineation of the ports used for initiating and receiving communications, which is beneficial for crafting firewall rules and monitoring network traffic. Address constraints 335 offer vendors the ability to specify allowable IP address ranges or specific addresses that the device can communicate with, thereby tightening the security framework and preventing unauthorized network interactions. Lastly, the network traffic type 336 entry is designed to capture the nature of the traffic, such as whether it is unicast, multicast, or broadcast, providing the security engine with the context it requires to control the one or more network devices to effectively manage network traffic and preempt potential security incidents.

FIG. 3E shows another screenshot 340 of IoT security engine vendor model generation. In this screenshot, the vendor model GUI includes entries for general information 341 (e.g., vendor name, version, agent, etc.), available authentication mechanisms 342 (e.g., transport layer security (TLS), etc.) and certificate profiles 343 (e.g., web API client, etc.) for the IoT controller/device in question. The vendor model GUI includes a dedicated section for specifying authentication mechanisms and certificate profiles, which are integral to the security of IoT devices. The general information area 341 is designed to capture not just the vendor's name but also the specific version of the device's software, and whether it includes an agent capable of facilitating advanced security features. The available authentication mechanisms 342 entry allows vendors to list all supported methods for authenticating device communications, such as Transport Layer Security (TLS), and any proprietary or specialized authentication protocols that may be employed. This ensures that the security engine can enforce the appropriate authentication standards for each device. The certificate profiles section 343 enables vendors to define the types of certificates that the device can use or require, such as those for a web API client, detailing the certificate's properties, such as the issuing authority, validity period, and cryptographic specifications. This comprehensive approach to defining authentication and certificate usage empowers the security engine to manage credentials effectively, ensuring that all device communications are authenticated and authorized according to the vendor's specifications.

As mentioned above, the enterprise model allows the enterprise to easily create a model of an installation configuration of the IoT controllers/devices that can then be used by the security engine to optimize security measures for a given installation. Generation of the enterprise model is now described in more detail.

Figure 4A:
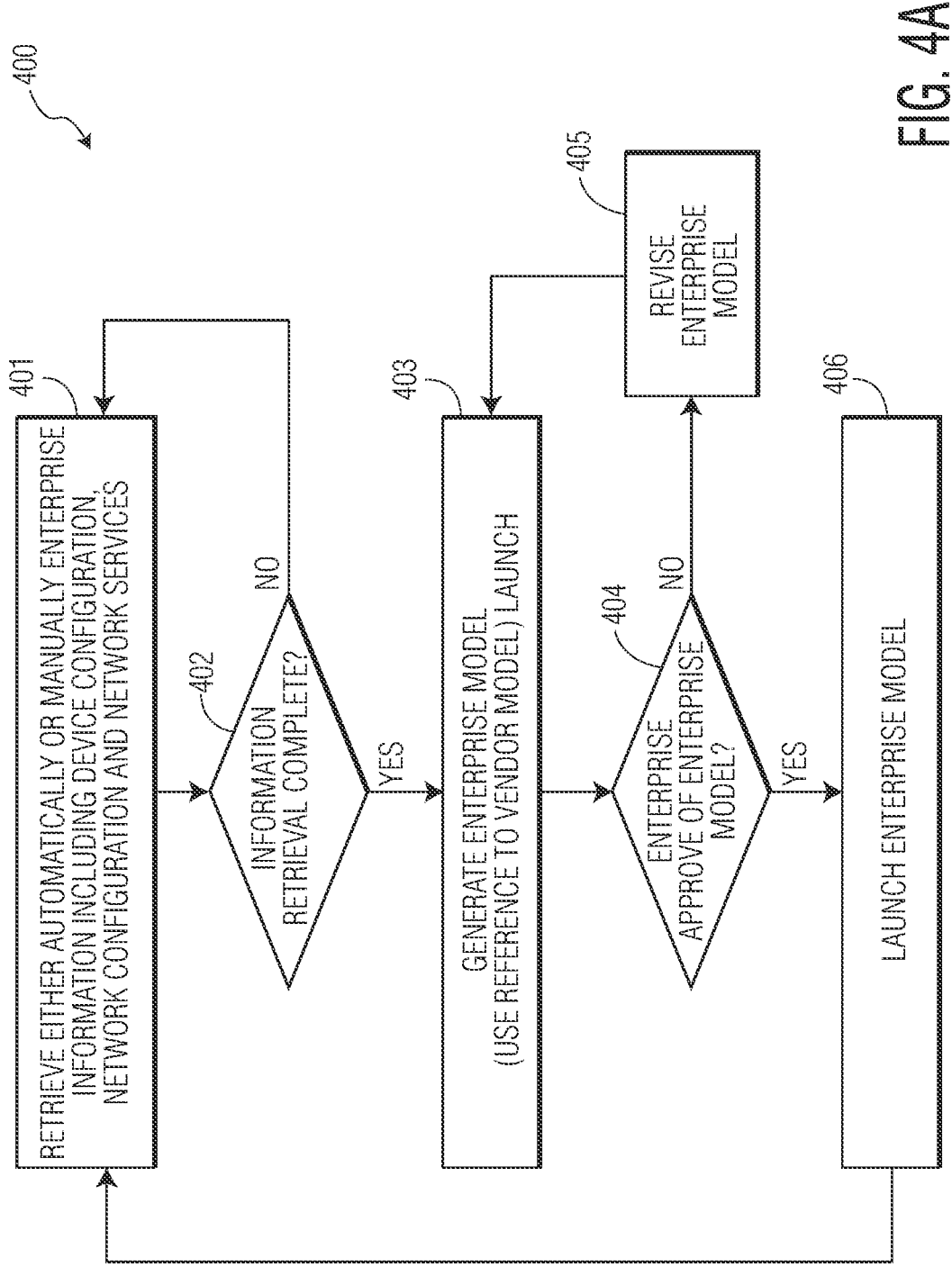
FIG. 4A shows a flowchart of IoT security engine enterprise model generation, according to an example embodiment of the present disclosure.

FIG. 4A shows a flowchart 400 of IoT security engine enterprise model generation. In step 401, the security engine retrieves the enterprise information (e.g., device configuration, network configuration, network services, etc.) either automatically or manually from the enterprise representative via the enterprise model GUI. If the information is complete in step 402, the security engine generates the enterprise model in step 403. Once generated, the enterprise model is reviewed by the enterprise representative for accuracy in step 404. If the enterprise model is not accurate, then the enterprise representative revises the enterprise model in step 405 and the enterprise model may be regenerated. If the enterprise model is accurate, then the security engine may launch the enterprise model in step 406 and begin executing security measures based on the enterprise model. In one example, enterprise network service configurations for a specific protocol may indicate how the interface authenticated and secured along with the set of devices that are allowed to participate in the protocol (e.g., which devices (by template/group) can be servers, which devices can be clients, and which devices can be peers). By assigning end-point templates to devices communications can be validated and the devices that participate in a protocol can be specified, including, for example, different sets of devices that may use the same protocol but aren't allowed to interact with each other.

FIG. 4B shows a screenshot 410 of IoT security engine enterprise model generation. In this screenshot, the enterprise model GUI includes entries for endpoint authorization 411 (e.g., authorization state, authorization source, etc.), system configuration 412 (e.g., security engine access, address, model, etc.), AAA controls 413 (e.g., certificate management, user management, etc.), EPP controls 414 (e.g., application profiles, process management, etc.) and ND controls 415 (e.g., firewall controls, etc.) for the IoT controller/device installation in question. The enterprise model GUI is designed to facilitate the detailed configuration of security settings tailored to the enterprise's specific installation of IoT devices. The endpoint authorization section 411 allows for granular control over the authorization states and sources, enabling the enterprise to define and manage the access levels of each IoT device within its network. System configuration 412 provides fields for specifying how the security engine interacts with the enterprise's network, including the network addresses of the security engine and the models of IoT devices it will secure, ensuring seamless integration and communication. The AAA controls 413 offer a centralized interface for managing certificate credentials and user access, which is beneficial for maintaining the integrity of the authentication and authorization processes. EPP controls 414 empower the enterprise to set up robust defenses at the device level, including application profiles and process management, to safeguard against malware and other endpoint threats. ND controls 415 provide the tools to configure network-level defenses such as firewall rules and intrusion detection parameters, fortifying the enterprise's network perimeter against cyberattacks. This comprehensive GUI ensures that the enterprise can establish a robust and integrated security posture that aligns with its operational requirements and security policies.

FIG. 4C shows another screenshot 420 of IoT security engine enterprise model generation. In this screenshot, the enterprise model GUI includes entries for vendor device models 421 (e.g., model identification and version number, etc.), general information 422 (e.g., vendor identification, version and operating system, etc.) and other menu items 423 (e.g., application profiles, etc.) for the IoT controller/device installation in question. The enterprise model GUI presents a platform for enterprises to define the deployment and operational parameters of IoT devices within their network. The section for vendor device models 421 is designed to allow enterprises to select from a list of predefined vendor IoT devices, specifying the exact model identification and version number to ensure compatibility and proper security provisioning. The general information area 422 captures the vendor's identification details, the version of the device, and the operating system it runs, which are all beneficial for tailoring the security measures to the device's specific capabilities and vulnerabilities. Additional menu items 423 provide a comprehensive set of options for enterprises to configure application profiles, which dictate the expected behavior and communication patterns of the IoT devices, ensuring that the security engine in conjunction with the one or more network devices can accurately monitor and protect the devices based on the enterprise's actual usage scenarios and security requirements.

Figure 4D:
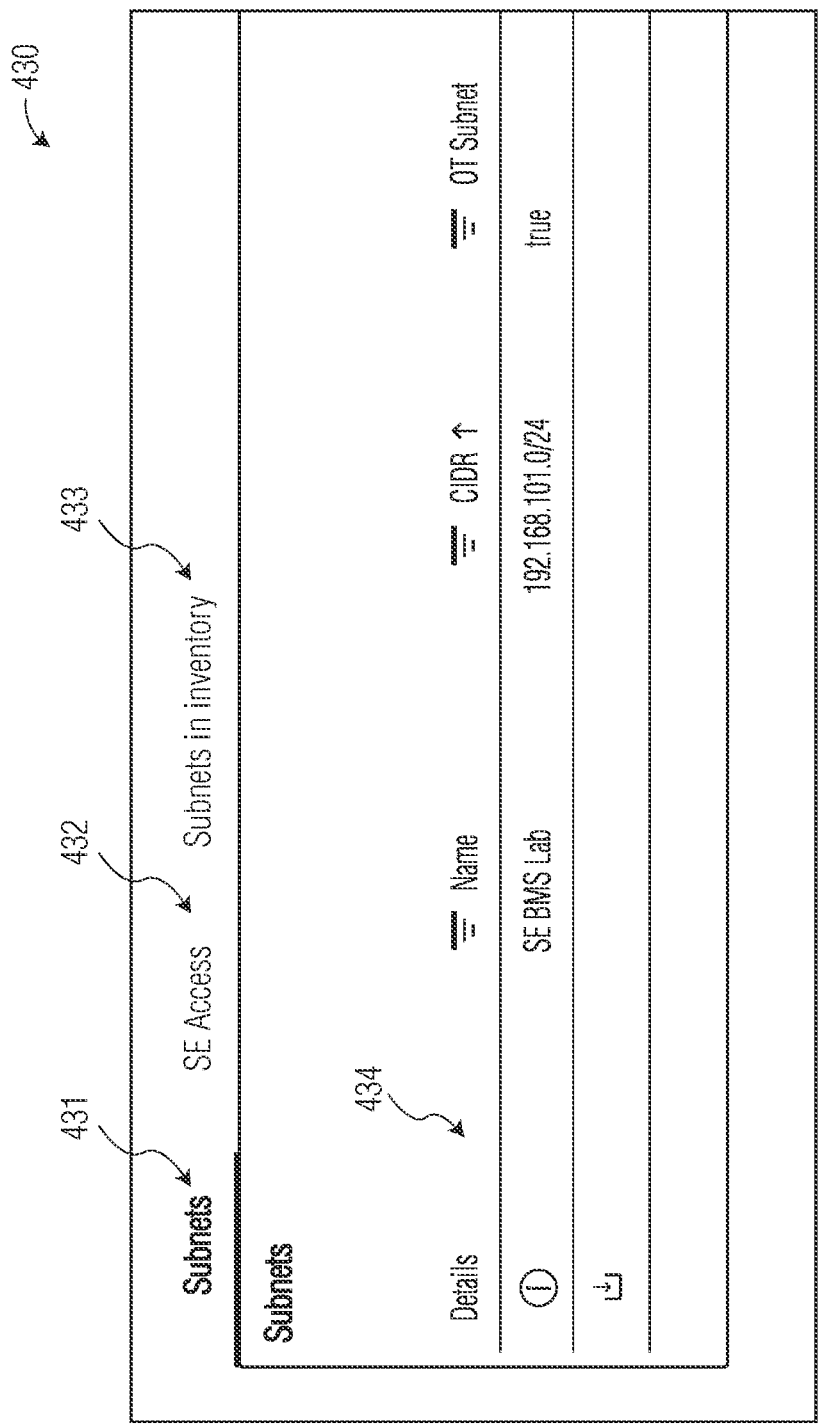
FIG. 4D shows a GUI screenshot of IoT security engine enterprise model generation, according to an example embodiment of the present disclosure.

FIG. 4D shows another screenshot 430 of IoT security engine enterprise model generation. In this screenshot, the enterprise model GUI includes entries for subnets 431 (e.g., states of networks within the enterprise, etc.), security engine access 432 (e.g., security engine controls, etc.), inventory 433 and display window 434 for displaying the selected menu items for the IoT controller/device installation in question. The enterprise model GUI is equipped with a detailed section for configuring network-related settings and overseeing the security infrastructure within the enterprise. The subnet entries 431 allow the enterprise to define and manage the state of various network segments, ensuring that security policies are appropriately applied to different areas of the network infrastructure. The security engine access field 432 is designated for setting up the parameters that govern how the security engine interfaces with the enterprise's network, which is instrumental for enabling the security engine to perform its monitoring and protective functions. The inventory section 433 provides a comprehensive overview of all IoT devices within the enterprise, facilitating effective asset management and security coverage. Additionally, the display window 434 serves as a dynamic area for visualizing the selected menu items, providing a clear and interactive representation of the enterprise's security configurations and the IoT devices' roles within the network, thereby enhancing the user's ability to manage and refine the security settings in an intuitive manner.

FIG. 4E shows another screenshot 440 of IoT security engine enterprise model generation. In this screenshot, the enterprise model GUI includes entries for configured network services 441 (e.g., API, etc.), authentication mechanisms 442 (e.g., TLS, etc.), additional client authentication 443 (e.g., credentials, etc.), trusted certificate authorities 444 (e.g., CA identification, etc.), network protocols 445 (e.g., TCP, etc.), providers 446 (e.g., web server, etc.) and consumers 447 (e.g., web client, etc.) for the IoT controller/device installation in question. The enterprise model GUI provides a comprehensive toolkit for enterprises to customize the security settings of their IoT devices with precision. The configured network services section 441 allows for the specification of various network services such as APIs (e.g., ports, protocols, etc.) that the IoT devices may offer or consume, enabling precise control over the network interactions and the data flow. Authentication mechanisms 442 offer a selection of security protocols, like TLS, to establish secure communication channels, ensuring that data in transit is protected against interception and tampering. The additional client authentication area 443 enables the enterprise to define extra layers of credential verification, bolstering the security of device access. Trusted certificate authorities 444 can be specified to manage the trust hierarchy and validate the authenticity of certificates used by IoT devices. Network protocols 445 such as TCP can be selected to match the communication requirements of the IoT devices, ensuring compatibility and efficient data exchange. Providers 446 and consumers 447 sections allow the enterprise to define the roles of IoT devices within the network, whether they serve as data providers like web servers or data consumers like web clients, establishing a clear operational context for each device within the enterprise's security framework.

FIG. 4F shows another screenshot 450 of IoT security engine enterprise model generation. In this screenshot, the enterprise model GUI includes entries for general information 451 (e.g., organization information and location, etc.), URLs 452 (e.g., certificate status protocol, etc.) and client information 453 (e.g., CA servers and clients, etc.) for the IoT controller/device installation in question. The enterprise model GUI features a dedicated section for managing the digital certificates and authentication details that are central to the security of IoT devices within the enterprise. The general information area 451 captures the foundational details of the organization, such as its name and location, which are integral to the configuration of security policies and the issuance of digital certificates. The URLs field 452 is specifically designed for the enterprise to input the addresses of certificate status protocol services, such as online certificate status protocol (OCSP), ensuring that the real-time validity of digital certificates can be verified, thereby maintaining the integrity of device communications. The client information section 453 allows for the registration of certificate authority (CA) servers and clients, establishing a trusted network of entities that are authorized to issue and manage digital certificates. This comprehensive approach to certificate and authentication management within the GUI ensures that the enterprise can maintain a robust security posture, with the ability to authenticate IoT devices reliably and manage their credentials effectively.

FIG. 4G shows another screenshot 460 of IoT security engine enterprise model generation. In this screenshot, the enterprise model GUI includes entries for vendor device model 461 (e.g., model name and version, etc.), general information 462 (e.g., vendor identification, version and OS, etc.) and additional menu items 463 for the IoT controller/device installation in question. The enterprise model GUI provides a streamlined process for enterprises to input and manage the configuration of their IoT devices. The vendor device model section 461 allows for the selection and specification of the IoT devices' model names and versions, ensuring that the security engine accurately recognizes the devices and applies the correct security protocols. The general information area 462 captures the vendor's identification details, the version of the device, and the operating system it runs on, which are all beneficial for the security engine to tailor its protective measures to the device's specific characteristics. Additional menu items 463 and 465 offer a range of configurable options such as authentication mechanisms and application profiles that allow the enterprise to further customize the security settings and operational parameters of the IoT devices, providing a high degree of control over how the devices function and interact within the enterprise's network environment. This detailed configuration capability within the GUI facilitates a robust and customized security posture tailored to the enterprise's specific IoT ecosystem.

As described above, the solution described herein includes generation of vendor models and enterprise models, installation of hardware devices at the enterprise location, monitoring of IoT controller/device communication and behavior, and control of security measures based on the monitored communication/behavior. The overall solution is described in more detail respect to the flowchart in FIG. 5 below.

Figure 5:
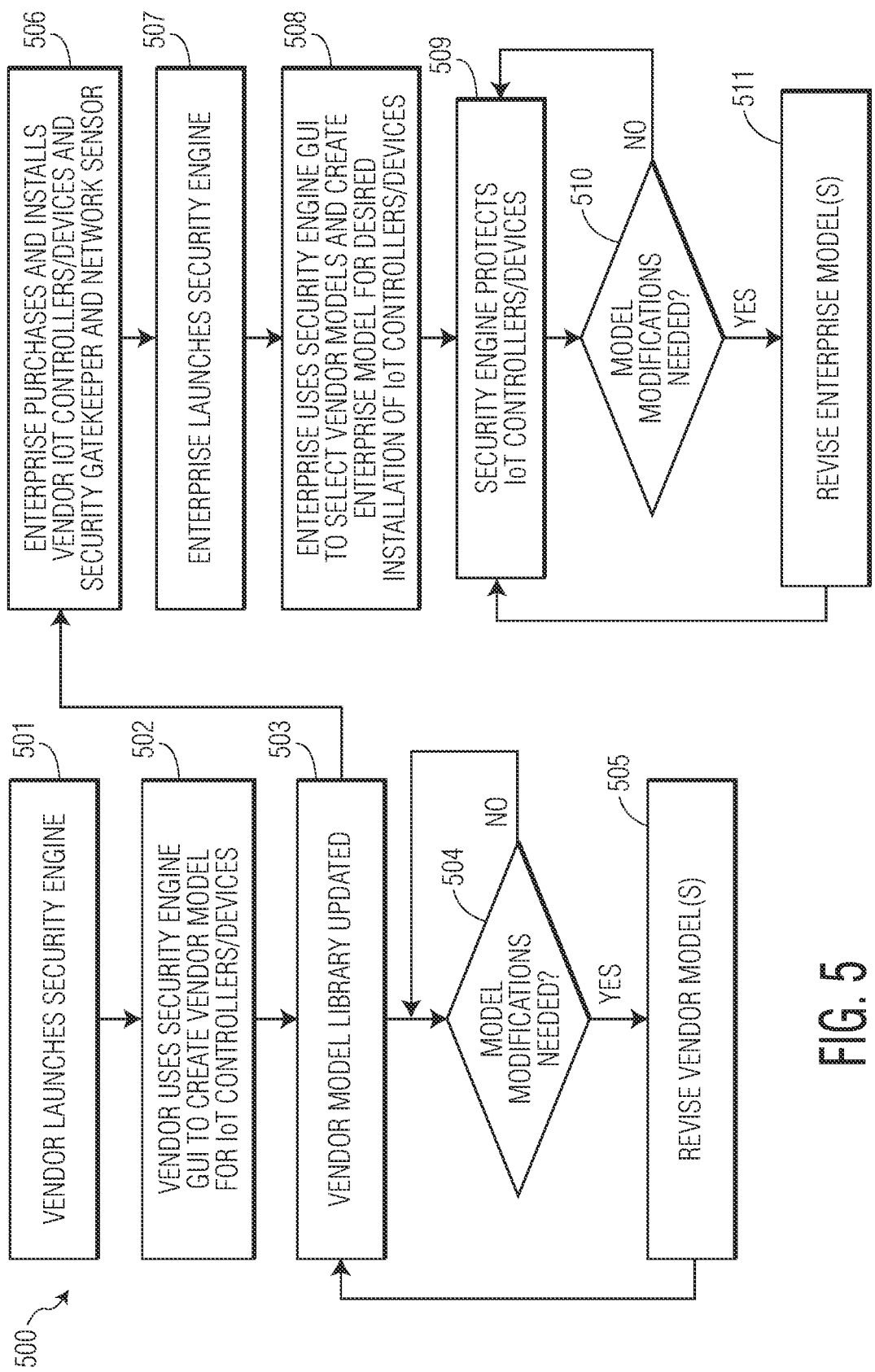
FIG. 5 shows a flowchart of IoT security engine model generation, deployment and execution, according to an example embodiment of the present disclosure.

FIG. 5 shows a flowchart 500 of IoT security engine model generation, deployment and execution. In step 501, the vendor launches the security engine. In step 502, the vendor utilizes the security engine GUI to create the vendor model for a given IoT controller/device. As mentioned above, the vendor may enter various pieces of information relating to the functional and behavioral capabilities of the IoT product being modeled. Once created, the vendor model library is updated in step 503. In step 504, the system determines if updates to the vendor model are desired. For example, the vendor may wish to modify or update the model based on new or corrected functional/behavioral capabilities of the IoT product. If further modifications are determined to be desired in step 504, then the model is revised in step 505 and the library is updated in step 503. After the vendor model library is updated with the new or revised vendor model, the vendor model may be available for use by an enterprise that desires to install the vendor IoT controller/device on premises. For example, in step 506, the enterprise purchases and installs the vendor IoT controller/device and the security gatekeeper and network sensor on premises. Installation may include installation of software agents on one or more of the IoT controllers/devices. Alternatively, the vendor may preinstall the software agents on one or more of the IoT controllers/devices prior to the enterprise purchasing the IoT controllers/devices. In other words, the IoT controllers/devices may come preloaded with appropriate software agents. During installation in step 507, the enterprise launches the security engine and in step 508 uses the security engine GUI to select vendor models and create an enterprise model for the desired installation configuration. In step 509, the security engine executes security measures (e.g., ND, EPP and AAA) to protect the IoT controllers/devices. These security measures are implemented by one or more of the gatekeeper, network sensor and/or IoT controllers/devices. Again, these solutions may or may not include software agents installed on the IoT controllers/devices. If in step 510 it is determined that modification to the enterprise model is desired, then the enterprise model is revised in step 511 and the security engine protects the IoT controllers/devices using the revised model in step 509. For example, the vendor may wish to modify or update the model based on new or corrected installation configurations.

In other words, the overall flow allows both the vendors and enterprises to easily create and revise their respective models to ensure that the security engine is optimized to the devices and installation configurations provided, even if the devices and installation configurations change over time. For example, if the enterprise replaces vendor IoT controllers/devices and/or rearranges the vendor IoT controllers/devices within the installation, modifications to the enterprise model may be made. Likewise, if the vendor updates their IoT controllers/devices, then modifications to the enterprise model may be made. In other words, updates may require revisions to one or both of the vendor model and the enterprise model. Such updates are easily made by the vendor or the enterprise via the vendor or enterprise model GUIs as described above.

It is noted that disclosed systems/methods represent a paradigm shift in the approach to IoT security by providing an integrated framework that unifies various security elements into a cohesive whole. While network defense (ND), authentication authorization and accounting (AAA), and end point protection (EPP) are established security measures, their true potential is often unrealized due to the complexities and gaps that arise when they are deployed as disparate solutions. This innovation transcends these limitations by harmonizing ND, AAA, and EPP through the use of meticulously crafted vendor and enterprise models. These models serve as the foundation for a security engine that orchestrates a full spectrum of security controls, ensuring that no aspect of the IoT environment is left unprotected.

The integration facilitated by this system is not merely a collection of security functions; it is an intelligent, dynamic framework that adapts to the evolving landscape of IoT threats. By leveraging vendor models that define the approved functionalities of IoT devices and enterprise models that encapsulate the operational context within which these devices are deployed, the security engine can apply a tailored security strategy that addresses the specific vulnerabilities and requirements of each IoT deployment. This level of integration ensures comprehensive coverage and a fortified security posture that manual configurations and piecemeal solutions cannot achieve. The system's expert integration capabilities automatically identify and bridge security gaps, providing a seamless and up-to-date defense mechanism that evolves in tandem with both the IoT devices and the threats they face.

Figure 6:
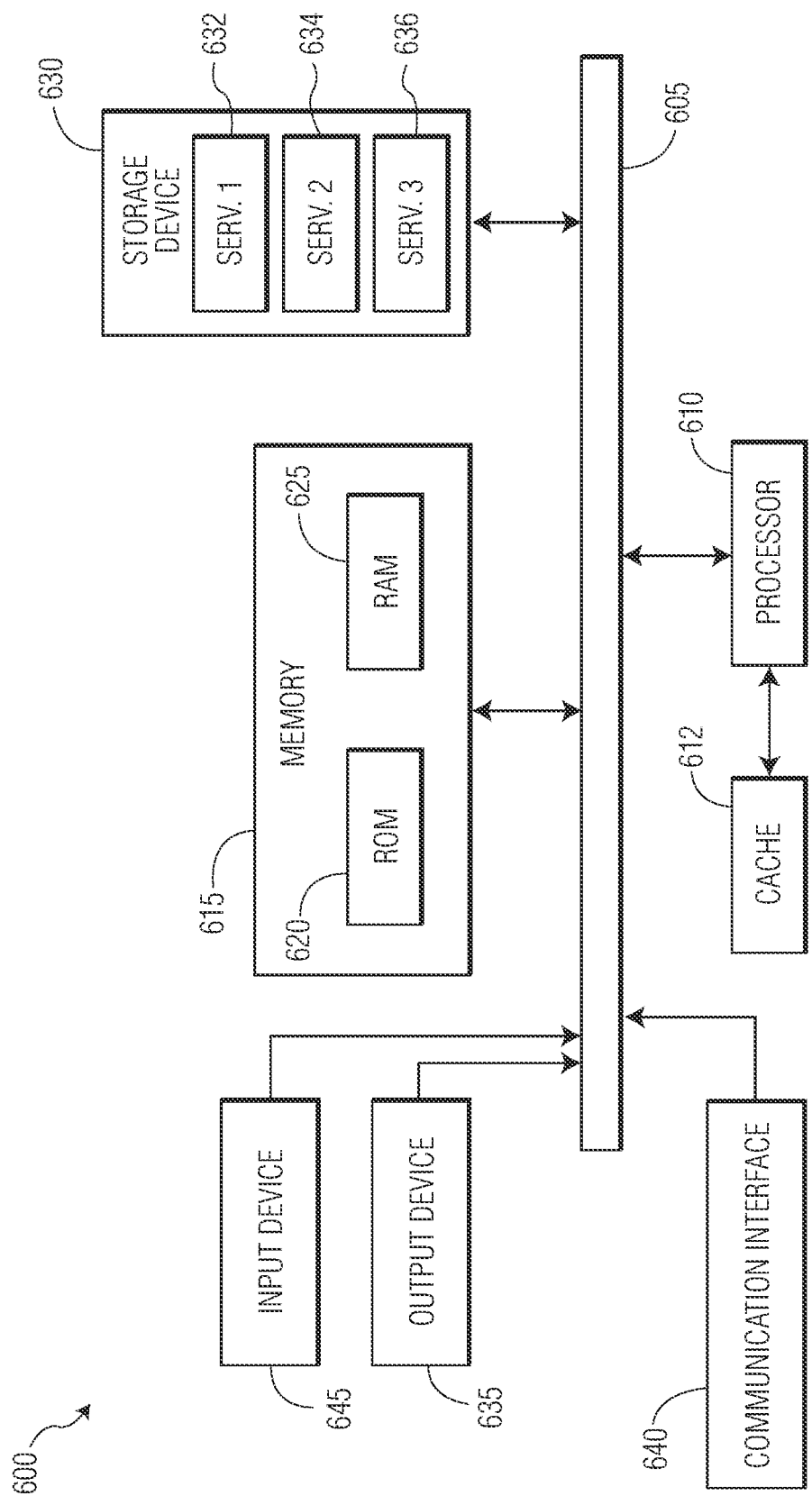
FIG. 6 shows a block diagram of components of the IT security system hardware and IoT device hardware, according to an example embodiment of the present disclosure.

FIG. 6 shows a block diagram of components of the IoT security system hardware and IoT device hardware. System 600 may be representative of at least a portion of each of the IoT Security System and/or Enterprise IoT Devices. One or more components of system 600 may be in electrical communication with each other using a bus 605. System 600 may include a processing unit (CPU or processor) 610 and a system bus 605 that couples various system components including the system memory 615, such as read only memory (ROM) 620 and random-access memory (RAM) 625, to processor 610. System 600 may include a cache of high-speed memory connected directly with, in close proximity to, or integrated as part of processor 610. System 600 may copy data from memory 615 and/or storage device 630 to cache 612 for quick access by processor 610. In this way, cache 612 may provide a performance boost that avoids processor 610 delays while waiting for data. These and other modules may control or be configured to control processor 610 to perform various actions. Other system memory 615 may be available for use as well. Memory 615 may include multiple different types of memory with different performance characteristics. Processor 610 may include any general-purpose processor and a hardware module or software module, such as service 1 632, service 2 634, and service 3 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing system 600, an input device 645 may represent any number of input mechanisms, such as a microphone for speech, a touch-sensitive screen for gesture or graphical input, keyboard, mouse, motion input, speech and so forth. An output device 635 may also be one or more of a number of output mechanisms known to those of skill in the art. In some instances, multimodal systems may enable a user to provide multiple types of input to communicate with computing system 600. Communications interface 640 may generally govern and manage the user input and system output. There is no restriction on operating on any particular hardware arrangement and therefore the basic features here may easily be substituted for improved hardware or firmware arrangements as they are developed.

Storage device 630 may be a non-volatile memory and may be a hard disk or other types of non-transitory computer readable media which may store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 may include services 632, 634, and 636 for controlling the processor 610. Other hardware or software modules are contemplated. Storage device 630 may be connected to system bus 605. In one aspect, a hardware module that performs a particular function may include the software component stored in a computer-readable medium in connection with the necessary hardware components, such as processor 610, bus 605, output device 635, and so forth, to carry out the function.

While the foregoing is directed to example embodiments described herein, other and further example embodiments may be devised without departing from the basic scope thereof. For example, aspects of the present disclosure may be implemented in hardware or software or a combination of hardware and software. One example embodiment described herein may be implemented as a program product for use with a computer system. The program(s) of the program product defines functions of the example embodiments (including the methods described herein) and may be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid-state random-access memory) on which alterable information is stored. Such computer-readable storage media, when carrying computer-readable instructions that direct the functions of the disclosed example embodiments, are example embodiments of the present disclosure.

It will be appreciated by those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A security system for internet of things (IoT) devices, comprising:
   a security engine server remote from an enterprise where the IoT devices are installed; and
   a network device installed at the enterprise,
   wherein the security engine server is configured to:
      receive functionality information of the IoT devices,
      generate a vendor model of the IoT devices based on the functionality information, the vendor model indicating vendor approved functionality of the IoT devices,
      receive installation information of the IoT devices,
      generate an enterprise model of the IoT device installation based on the installation information, the enterprise model indicating enterprise approved functionality of the IoT devices, and
      control the network device to provide security services to the IoT devices installed at the enterprise based on the vendor model and the enterprise model.

2. The security system of claim 1, wherein the security services comprise network defense (ND) to prevent the IoT devices from communicating with unauthorized devices internal to the network and external to the network.

3. The security system of claim 1, wherein the security engine server is configured to provide end point protection (EPP) as part of the security services, the EPP comprising monitoring the IoT devices for cyberthreats, the EPP is performed by the network device or by an agent installed on the IoT devices.

4. The security system of claim 1, wherein the security engine server is configured to provide authentication authorization and accounting (AAA) as part of the security services, the AAA comprising creating and managing certificate credentials for the IoT devices, the certificate credentials created by a private certificate authority managed by the security engine server.

5. The security system of claim 1, wherein in response to threats detected by the security services, the security engine server is configured to:
   execute network defense (ND) by blocking communications transmitted by the IoT devices or blocking communications to be received by the IoT devices,
   execute end point protection (EPP) to detect cyberthreats, and
   execute authentication authorization and accounting (AAA) to provide and mange credentials for the IoT devices.

6. The security system of claim 1, wherein the security engine server is configured to generate the vendor model of the IoT devices by providing a graphical user interface (GUI) comprising vendor selectable options for defining the vendor approved functionality of the IoT devices.

7. The security system of claim 6, wherein the selectable options for defining the vendor approved functionality of the IoT devices comprise options for identifying models of the IoT devices, selecting communication capabilities of the IoT devices, and selecting application profiles of the of the IoT devices.

8. The security system of claim 1, wherein the security engine server is configured to generate the enterprise model of the IoT devices by providing a graphical user interface (GUI) comprising enterprise selectable options for defining the enterprise approved functionality of the IoT devices.

9. The security system of claim 8, wherein the selectable options for defining the enterprise approved functionality of the IoT devices comprise options for identifying roles of the IoT devices, selecting authorized communication behavior of the IoT devices, and selecting a hierarchy of the IoT devices within the enterprise.

10. The security system of claim 1, wherein the security engine server is configured to integrate the security services with existing vendor security services and existing enterprise security services.

11. A method for executing a security system for internet of things (IoT) devices, the security system comprising a security engine server remote from an enterprise where the IoT devices are installed and a network device installed at the enterprise, the method comprising:
   receiving, by the security engine server, functionality information of the IoT devices;
   generating, by the security engine server, a vendor model of the IoT devices based on the functionality information, the vendor model indicating vendor approved functionality of the IoT devices;

receiving, by the security engine server, installation information of the IoT devices;

generating, by the security engine server, an enterprise model of the IoT device installation based on the installation information, the enterprise model indicating enterprise approved functionality of the IoT devices; and controlling, by the security engine server, the network device to provide security services to the IoT devices installed at the enterprise based on the vendor model and the enterprise model.

12. The method for executing the security system of claim 11, comprising:

executing, by the security engine server, as part of the security services, network defense (ND) to prevent the IoT devices from communicating with unauthorized devices internal to the network and external to the network.

13. The method for executing the security system of claim 11, comprising:

executing, by the security engine server, as part of the security services, end point protection (EPP), the EPP comprising monitoring the IoT devices for cyberthreats, the EPP is performed by the network device or by an agent installed on the IoT devices.

14. The method for executing the security system of claim 11, comprising:

executing, by the security engine server, as part of the security services, authentication authorization and accounting (AAA), the AAA comprising creating and managing certificate credentials for the IoT devices, the certificate credentials created by a private certificate authority managed by the security engine server.

15. The method for executing the security system of claim 11, comprising:

wherein in response to threats detected by the security:

executing, by the security engine server, network defense (ND) by blocking communications transmitted by the IoT devices or blocking communications to be received by the IoT devices, executing, by the security engine server, end point protection (EPP) to detect cyberthreats, and executing, by the security engine server, authentication authorization and accounting (AAA) to provide and mange credentials for the IoT devices.

16. The method for executing the security system of claim 11, comprising:

generating, by the security engine server, the vendor model of the IoT devices by providing a graphical user interface (GUI) comprising vendor selectable options for defining the vendor approved functionality of the IoT devices.

17. The method for executing the security system of claim 16, comprising:

providing, by the security engine server, the selectable options for defining the vendor approved functionality of the IoT devices comprising options for identifying models of the IoT devices, selecting communication capabilities of the IoT devices, and selecting application profiles of the of the IoT devices.

18. The method for executing the security system of claim 11, comprising:

generating, by the security engine server, the enterprise model of the IoT devices by providing a graphical user interface (GUI) comprising enterprise selectable options for defining the enterprise approved functionality of the IoT devices.

19. The method for executing the security system of claim 18, comprising:

providing, by the security engine server, the selectable options for defining the enterprise approved functionality of the IoT devices comprising options for identifying roles of the IoT devices, selecting authorized communication behavior of the IoT devices, and selecting a hierarchy of the IoT devices within the enterprise.

20. The method for executing the security system of claim 11, comprising:

integrating, by the security engine server, security services with existing vendor security services and existing enterprise security services.

\* \* \* \* \*